United States Patent
Conrad

(10) Patent No.: US 12,320,529 B2
(45) Date of Patent: Jun. 3, 2025

(54) COMBUSTION COOKING APPLIANCE

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 553 days.

(21) Appl. No.: 17/572,323

(22) Filed: Jan. 10, 2022

(65) Prior Publication Data

US 2023/0221002 A1 Jul. 13, 2023

(51) Int. Cl.
| | |
|---|---|
| F24C 3/00 | (2006.01) |
| F24C 3/04 | (2021.01) |
| F24C 3/12 | (2006.01) |
| F24C 15/16 | (2006.01) |
| F24C 15/20 | (2006.01) |
| F24C 15/24 | (2006.01) |

(52) U.S. Cl.
CPC .............. F24C 3/047 (2013.01); F24C 3/126 (2013.01); F24C 15/166 (2013.01); F24C 15/20 (2013.01); F24C 15/24 (2013.01)

(58) Field of Classification Search
CPC .......... A47J 37/0704; F24B 1/22; F24B 5/08; F24B 7/002; F24B 7/005; F24B 7/04; F24C 15/32

See application file for complete search history.

(56) References Cited

U.S. PATENT DOCUMENTS

| | | | |
|---|---|---|---|
| 2,779,580 A | * | 1/1957 | Steinitz ............. C04B 35/58092 432/213 |
| 5,528,984 A | | 6/1996 | Saurwein |
| 5,556,515 A | * | 9/1996 | Giunta .................... C10B 25/06 126/192 |
| 5,891,498 A | | 4/1999 | Boehler |
| 6,205,996 B1 | | 3/2001 | Ryan |
| 8,890,037 B2 | | 11/2014 | Best |
| 9,839,224 B2 | | 12/2017 | Patton |
| 2005/0217659 A1 | | 10/2005 | Mcclenahan |
| 2022/0160175 A1 | * | 5/2022 | Wright ..................... A47J 36/32 |
| 2023/0221001 A1 | * | 7/2023 | Conrad ..................... F24B 5/08 126/19 R |

FOREIGN PATENT DOCUMENTS

DE 4208575 A1 * 12/1992 .......... A47J 37/0704

* cited by examiner

*Primary Examiner* — Ko-Wei Lin
(74) *Attorney, Agent, or Firm* — Philip C. Mendes Da Costa; SMART & BIGGAR LP

(57) ABSTRACT

A cooking appliance including a combustion zone and a cooking zone. The combustion zone has a combustion zone air flow path extending from a combustion zone air inlet to a combustion zone air outlet. The cooking zone overlies the combustion zone, and the cooking zone includes a closed cooking volume having a cooking surface and an openable lid. Combustion products produced in the combustion zone are isolated from the closed cooking volume.

20 Claims, 20 Drawing Sheets

COMBUSTION COOKING APPLIANCE

FIELD

This disclosure relates generally to cooking appliances that have a combustion zone in which a fuel is combusted to produce heat and a cooking zone that is heated by the combustion, and in particular to combustion cooking appliances such as barbecues and smokers.

INTRODUCTION

The following is not an admission that anything discussed below is part of the prior art or part of the common general knowledge of a person skilled in the art.

Various types of cooking appliances are known, including electric ranges, gas ranges, barbecues, and smokers. Further, various designs for combustion cooking appliances are known in the art, such as barbecues and smokers in which fuel is combusted in a combustion zone of the cooking appliance.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

As discussed herein, the cooking appliance may be a combustion cooking appliance that includes a combustion zone in thermal communication with a cooking zone. The combustion zone may be, e.g., in a combustion chamber provided to contain the combustion of a fuel, which is optionally a solid fuel such as fuel pellets made of compressed organic matter, charcoal or the like. A combustion air flow path, which provides air for combustion in the combustion zone, may extend from a combustion zone air inlet, through the combustion zone, to a combustion zone air outlet.

In accordance with one aspect of this disclosure, which may be used alone or in combination with any one or more other aspects, the cooking zone is fluidically isolated from the combustion zone. The cooking zone may be fluidically isolated from the combustion air flow path downstream (and, optionally, upstream) of the combustion zone. That is, by-products (e.g., ash or gases) generated by combustion in the combustion zone and carried downstream through the combustion air flow path are inhibited or prevented from entering the cooking zone. Accordingly, the gases that leave the combustion zone are guided out of the cooking appliance without passing through the cooking zone. Optionally, the gases that leave the combustion zone are carried to an elevation above the cooking zone via an outlet conduit, and the outlet conduit may be part of a chimney.

In accordance with another aspect of this disclosure, which may be used alone or in combination with any one or more other aspects, an air impermeable plate extends between the cooking zone and the combustion zone. The air impermeable plate separates the cooking zone from combustion by-products generated in the combustion zone, such as ash and gases that carry the ash, while allowing for heat transfer. For example, the plate may allow for conductive and/or infrared radiation heat transfer. The air impermeable plate may form a lower wall of the cooking zone and an upper wall of the combustion zone. That is, at least one portion of the combustion zone may be separated from at least one portion of the cooking zone by only a single plate. The air impermeable plate may form part or all of the cooking surface of the cooking zone. That is, the plate may form a lower surface of the cooking zone, such as when the cooking zone overlies the combustion zone.

In accordance with another aspect of this disclosure, which may be used alone or in combination with any one or more other aspects, a surface of the combustion zone and/or a surface of the cooking zone includes channels to guide fluid flow. For example, the combustion zone may include gas collection channels in a lateral wall and/or upper wall to guide the flow of hot gases. The cooking zone may include drainage channels in a lower wall to guide the flow of liquid produced during cooking (e.g., grease). The cooking zone may be separated from the combustion zone by the impermeable plate, and fluid flow channels may be formed in the impermeable plate. The fluid flow channels may be formed in the combustion zone surface (i.e., gas collection channels) and/or in the cooking zone surface (i.e., drainage channels) of the impermeable plate. Optionally, the impermeable plate is a corrugated plate, in that the channels in one surface correspond to ridges in the opposite surface.

In accordance with another aspect of this disclosure, which may be used alone or in combination with any one or more other aspects, the cooking appliance includes a surface, e.g., the cooking surface, that is shaped and/or oriented to carry liquids produced during cooking, e.g., grease, away from the cooking zone and/or the combustion zone. The liquid-carrying surface may be a liquid-impermeable surface such that liquids produced during cooking do not pass through the surface, e.g., into the combustion zone. For example, the cooking zone may overly a combustion zone, and the liquid-carrying surface may prevent grease from falling from the cooking zone into the combustion zone. The liquid-carrying surface may have a region of lower elevation such that liquids are encouraged by gravity to flow towards the region of lower elevation, and the liquid-carrying surface may be arranged such that this flow of liquid moves the liquid away from the cooking zone. For example, the surface may be the surface of an angled plate such that liquids flow down the plate towards a low end, and the low end may be arranged at an edge of the cooking zone, e.g., the front edge or a side edge. The liquid-carrying surface may be arranged to direct the liquid out of the cooking zone entirely. For example, the liquid-carrying surface may direct liquid into a drip tray exterior to the cooking zone.

In accordance with another aspect of this disclosure, which may be used alone or in combination with any one or more other aspects, fuel may be inserted into the combustion zone through a lateral opening. The fuel may be slid into the combustion zone through the lateral opening. The fuel may be on a fuel tray, and the fuel tray may be slidably received into the combustion zone through the lateral opening. The fuel tray may hold solid fuel, such as pellets, and may include a grate to hold the fuel away from walls of the combustion zone (i.e., to allow for air flow). Optionally, the fuel tray is sized to hold at least 20 grams, at least 50 grams, or at least 100 grams of fuel pellets. It will be appreciated that a plurality of fuel trays that are laterally positioned side by side may be used as discussed subsequently with respect to providing a plurality of cooking zones.

In accordance with another aspect of this disclosure, which may be used alone or in combination with any one or more other aspects, fuel received in the combustion zone is arranged in distinct fuel zones. A user may be able to control in which order the fuel zones are combusted. Fuel zones may be arranged sequentially along the length of a combustion zone and/or fuel tray. An ignition region and/or air inlet region may be at one end of the combustion zone and/or fuel tray (e.g., the one end may be a front end of the fuel tray, which may be located adjacent an opening through which the fuel tray is inserted), with the fuel zones arranged along the length of the combustion zone and/or fuel tray progressively farther from the ignition region and/or air inlet region (e.g., the fuel tray may extend axially from the opening through which the fuel tray is inserted to a rear end which has a combustion zone air outlet). In other words, the fuel is organized in an elongated arrangement of solid fuel pieces such that combustion may proceed from one end (e.g., a front end) of the elongated arrangement to the other (e.g., a rear end). Accordingly, the fuel in the portion of the fuel tray located at a combustion zone air inlet may be ignited. As this fuel is ignited, the combustion gasses are drawn along (e.g., above, below and/or laterally beside) the fuel in the remainder of the fuel tray as the combustion gasses are drawn upwardly through the combustion zone air outlet (e.g., a chimney at the combustion zone air outlet). Accordingly, if the combustion zone air inlet is at the front end of the cooking appliance and the chimney is at the rear end, then the combustion gasses will be drawn rearwardly and will heat the fuel in the remainder of the fuel tray to its combustion temperature and thereby ignite the rest of the fuel in the fuel tray. Optionally, it will be appreciated that fuel may only be provided in part of a fuel tray (e.g., the front half) so that, e.g., only the front half of the cooking zone may be heated, thereby reducing the amount of fuel that is required. To this end, the fuel tray may be divided into a series of regions, one rearward of the other, and only some of the regions may be provided with fuel.

In accordance with another aspect of this disclosure, which may be used alone or in combination with any one or more other aspects, air flow through the cooking appliance may be controlled by changing the cross-sectional flow area of at least one portion of the combustion zone air flow path. The cooking appliance may include an adjustment mechanism upstream and/or downstream of the combustion zone to change the cross-sectional area of the combustion zone air flow path at a point upstream and/or downstream of the combustion zone. For example, the cross-sectional flow area of the combustion zone air inlet may be variable. The cooking appliance may include an inlet adjustment mechanism to control the cross-sectional area of the combustion zone air inlet. The adjustment mechanism may be manual or automatic. An automatic adjustment mechanism may control the cross-sectional area of the air flow path as a temperature in the combustion zone varies. For example, the inlet adjustment mechanism may include a controller that receives a sensed temperature reading from the combustion zone and/or the cooking zone and controls the cross-sectional area in response to the temperature reading. Optionally, the inlet adjustment mechanism responds directly to temperature. For example, a bimetallic member, which changes shape in response to temperature changes, may be used to open or close a louver or damper, or may form part or all of a louver or damper.

In accordance with another aspect of this disclosure, which may be used alone or in combination with any one or more other aspects, the walls of the air flow path through the outlet conduit may be a thin-walled structure such that the outlet conduit may be rapidly heated, e.g., by warm gases coming from the combustion zone. Since the outlet conduit heats rapidly, the draft through the combustion zone increases quickly, thereby quickly bringing the cooking zone to temperature. As the outlet conduit is thin walled, it may be reinforced by an outlet wall so that the outlet conduit is not damaged. The outlet conduit may be formed from a conductive material, such as metal and may comprise, consist essentially of or consist of a chimney. Accordingly, a cooking appliance may have a double layered chimney wherein the inner layer is the outlet conduit and the outer layer may be a support structure for the thin-walled outlet conduit. The exterior of the outlet conduit may be insulated to prevent it from being rapidly cooled by environmental air, and the support structure may insulate the outlet conduit and/or insulation may be provided between the support structure and the outlet conduit.

In accordance with another aspect of this disclosure, which may be used alone or in combination with any one or more other aspects, the cooking appliance includes a plurality of combustion zones and/or a plurality of cooking zones. For a plurality of combustion zones, the cooking appliance may include a plurality of combustion chambers and a plurality of fuel trays, along with one or more plates, one or more lids, one or more drip trays, and one or more chimneys. For example, the cooking appliance may be formed of a plurality of combustion chambers, each of which may have its own fuel tray and/or outlet conduit, but only, e.g., a single plate, a single drip tray, and/or a single lid. Alternately or in addition, the cooking appliance may include a plurality of cooking zones, such as two separate cooking zones, each of which may have its own cooking zone lid, but over a shared combustion zone. Separate cooking and/or combustion zones may allow for a more controlled combustion, differently heated regions within the cooking zone, and/or separated food combustion. Accordingly, for example, a cooking zone may overlie a combustion zone that is provided with a plurality of fuel trays arrayed laterally side by side. Therefore, for example, a single chamber that is positioned over 2 or more of the fuel trays, may provide 2 or more cooking zones, each of which may overlie a single fuel tray. In this way, only the cooking zones which overlie a fuel tray in which combustion occurs may be used for cooking. It will be appreciated that each such cooking zone may have its own lid so that each cooking zone is individually openable. Accordingly, only part of the cooking zone may be heated, thereby reducing the amount of fuel that is used in a cooking operation.

In accordance with another aspect of this disclosure, which may be used alone or in combination with any one or more other aspects, at least one component of the cooking appliance is formed of a plurality of modules. For example, a large cooking surface may be formed of a plurality of plates. Alternately or in addition, a plurality of lids may be provided to divide a large cooking surface into a number of cooking zones. The plates and/or the lids may be removably mounted and sized to fit in a dishwasher. A modular construction may allow for parts sized for easy cleaning (e.g., to fit in a dishwasher) while allowing for a larger whole.

In accordance with another aspect of this disclosure, which may be used alone or in combination with any one or more other aspects, a flavor additive may be added to food in the cooking zone. The flavor additive may be, e.g., smoke. That is, smoke may be added to the cooking zone. The smoke may be produced from wood chips that are located exterior to the cooking zone and which are isolated from the combustion zone. Alternately, or in addition, the flavor additive may be produced by combustion in the cooking zone. For example, a container may be positioned in the cooking zone, e.g., to hold a material such as wood chips, that are to be heated to produce smoke. A cooking zone air flow path may extend through the cooking zone from a cooking zone air intake to a cooking zone air outlet, to feed air for the production of the smoke. As discussed previously, the cooking zone air flow path may be fluidically isolated from the combustion zone air flow path.

In accordance with another aspect of this disclosure, which may be used alone or in combination with any one or more other aspects, the cooking appliance may be used to generate electricity. For example, the cooking appliance may include a thermoelectric generator, such as a thermopile. The electricity generated by the cooking appliance may be used to power onboard powered components (e.g., a light, a rotisserie), may be stored (e.g., the cooking appliance may incorporate or be connected to an energy storage device such as a battery or capacitor), and/or may be provided for use by external devices. Optionally, the cooking appliance includes a power supply coupling such as a universal serial bus connection port.

In accordance with another aspect of this disclosure, which may be used alone or in combination with any one or more other aspects, a user is able to control the transfer of heat between the combustion zone and the cooking zone. The user may control the transfer of heat between the combustion zone and the cooking zone by controlling the movement of hot gases from the combustion zone towards and/or in thermal communication with the cooking zone. The cooking appliance may include an adjustable damper between the combustion zone and the cooking zone. The adjustable damper may be arranged to control the flow of hot gases from the combustion zone towards the cooking zone, such as by controlling the flow of hot gases towards the impermeable plate separating the cooking zone and the combustion zone. A temperature sensor may provide a signal indicative of the temperature, e.g., in the cooking zone and/or of the cooking surface, and the damper may be operable (e.g., by a solenoid or motor) based on a signal from the sensor.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
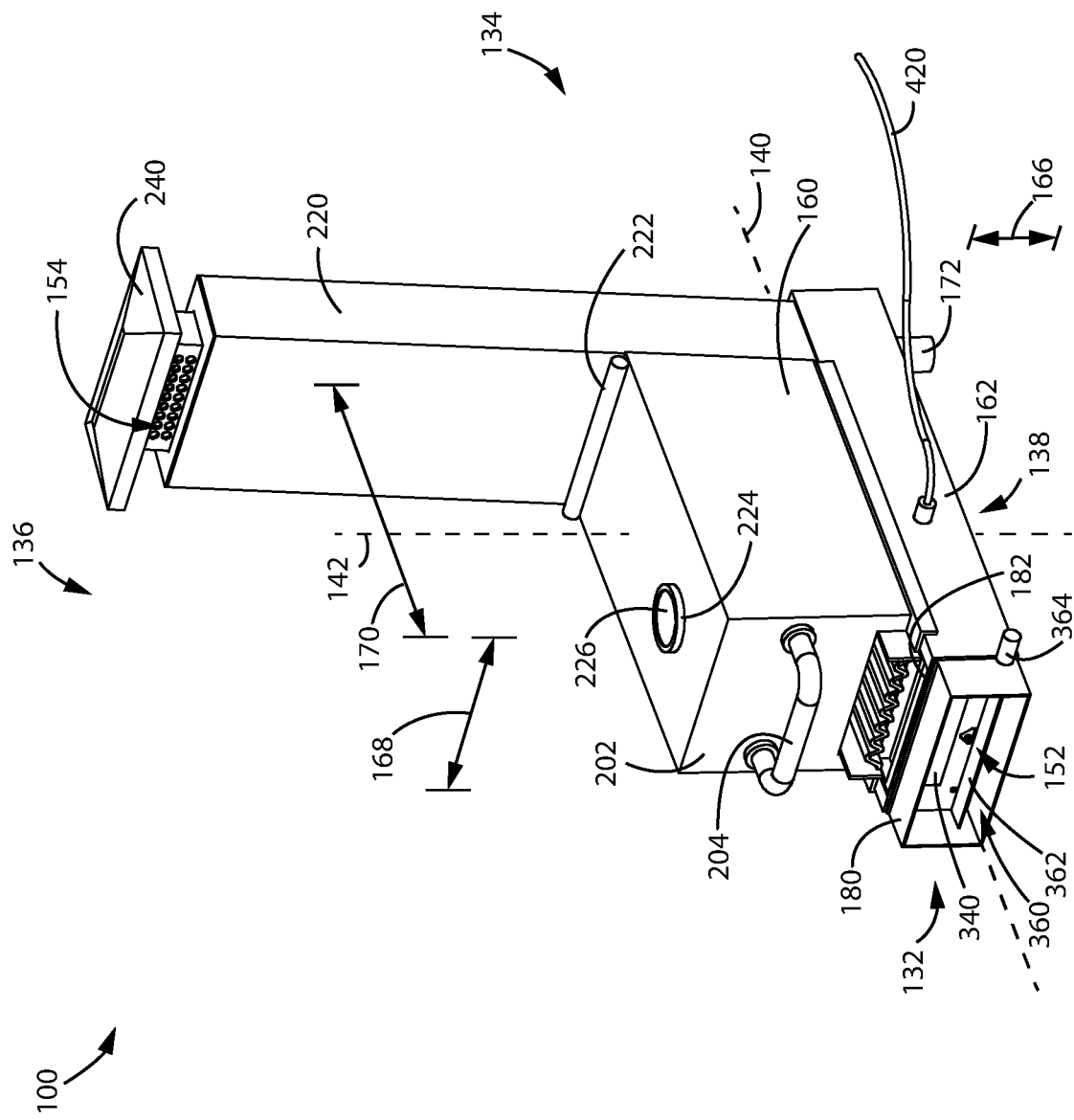
FIG. 1 is a front top perspective view of a first cooking appliance.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

General Description of a Cooking Appliance

Figure 2:
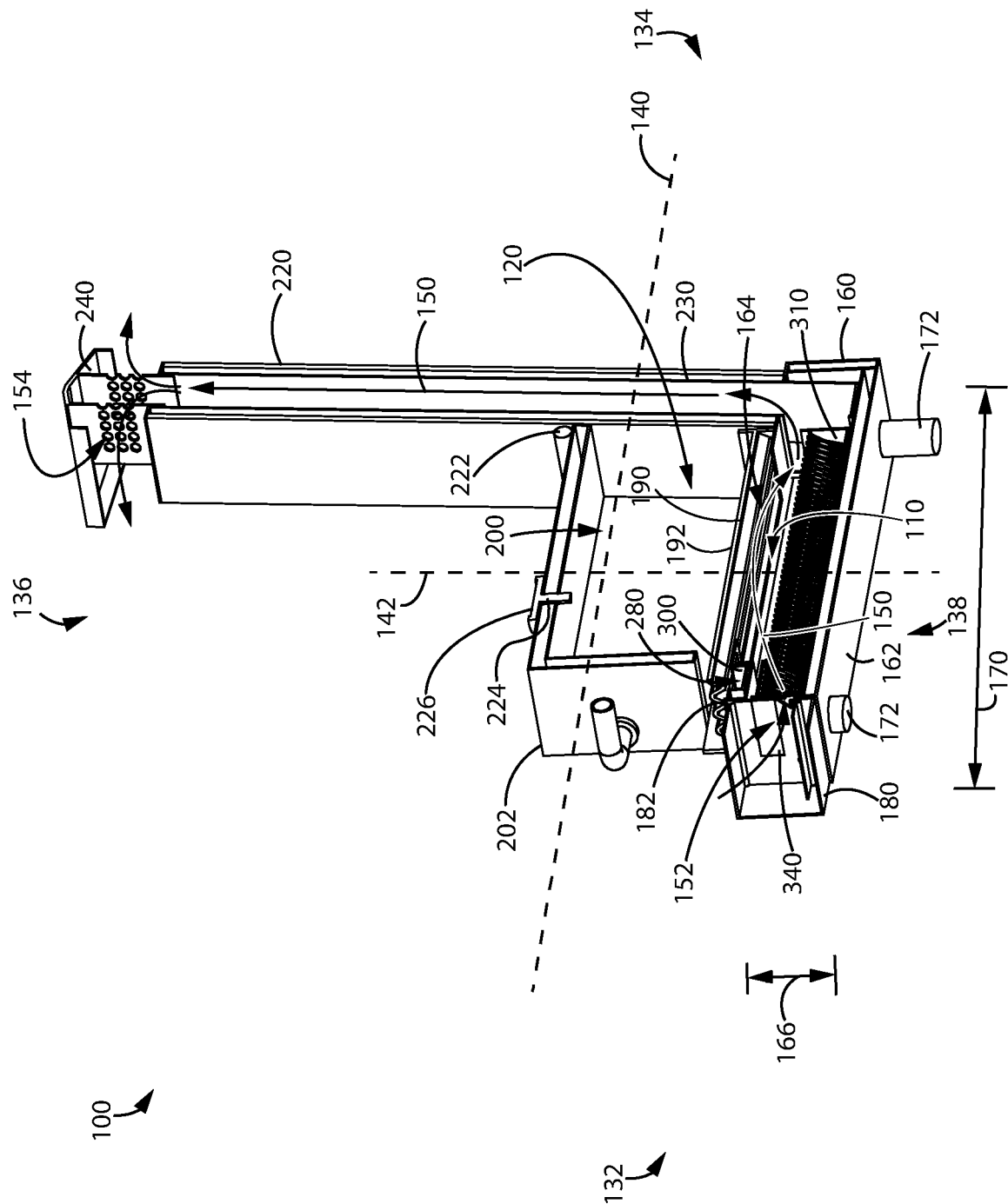
FIG. 2 is a first cross-sectional view (along a front to rear axis) of the cooking appliance of FIG. 1.

Referring to FIGS. 1 and 2, an exemplary embodiment of a cooking appliance is shown generally as 100. The illustrated example cooking appliance is a combustion cooking appliance and may be referred to as a barbeque.

As used herein, a combustion cooking appliance is a cooking appliance that uses the combustion of fuel in the appliance to cook food. That is, the cooking appliance includes a combustion zone 110 in thermal communication with a cooking zone 120.

As exemplified, the combustion zone 110 may be a chamber and/or region to hold a solid fuel such as wood chips, charcoal, or pellets (e.g., pellets made from wood, switchgrass, sargassum, seagrass, and/or bamboo). Alternately, or in addition, the combustion zone 110 may be a chamber or region in which liquid fuel is burned, such as propane or natural gas.

Accordingly, the combustion zone 110 may use an onboard fuel supply. For example, charcoal or pellets may be arranged in the combustion zone 110 and subsequently ignited in situ. Alternately or in addition, it will be appreciated that a portable cooking appliance may also be used as a tethered cooking appliance by coupling it to an external source of fuel to receive fuel while cooking. For example, a portable cooking appliance may be removable connectable with a propane tank or a line from an external gas source, such as natural gas.

Optionally, the cooking appliance 100 is a portable cooking appliance. As used herein, a portable cooking appliance is a cooking appliance that is not mounted in place and may be used by a user. For example, the cooking appliance 100 may be countertop appliance and may be used indoors and/or outdoors.

It will be appreciated that any one or more of the aspects of the cooking appliance 100 set out herein may alternately be used in any type of cooking appliance, such as an electric cooking appliance and/or a tethered cooking appliance. It will also be appreciated that a cooking appliance may use any configuration of the aspects exemplified herein, such as any configuration of the fuel zones, combustion zones, and cooking zones.

As exemplified in FIG. 1, the cooking appliance 100 has a front end 132, a rear end 134, an upper end or top 136 and a lower end or bottom 138 with a longitudinal axis 140 that extends between the front and the rear ends 132, 134 and a vertical axis 142 that extends between the top 136 and the bottom 138.

As exemplified in FIG. 2, a combustion air flow path 150 extends from a combustion zone air inlet 152 to a combustion zone air outlet 154. The combustion air flow path 150 extends through the combustion zone 110. The combustion air flow path 150 provides air to the combustion zone 110 and carries combustion by-products (e.g., ash and gases) away from the combustion zone 110.

As exemplified, the combustion zone air inlet 152 may be provided at a front end 132 of the cooking appliance 100 (e.g., the opening through which a fuel tray is slidably insertable as discussed subsequently). The combustion zone air inlet 152 may also or alternately be adjacent the bottom end 138 of the cooking appliance 100. The combustion zone air outlet 154 may be provided at the upper end 136 of the cooking appliance 100 (e.g., at the upper end of a chimney as discussed subsequently). The combustion zone air outlet 154 may also or alternately be adjacent the rear end 134 of the cooking appliance 100. The combustion zone air outlet 154 may be generally opposite the combustion zone air inlet 152. It will be appreciated that the combustion zone air outlet 154 and/or the combustion zone air inlet 152 may be provided at different locations and/or be of different configurations then described above. Optionally, as exemplified, the combustion air flow path provides a flow of air that travels past the fuel provided in the combustion zone 110. As exemplified, the combustion air flows rearwardly over the fuel provided in the combustion zone 110.

The cooking zone 120 is in thermal communication with the combustion zone 110. As exemplified, the cooking zone 120 is positioned above the combustion zone 110, in that the cooking zone 120 is at an elevation that is greater than the elevation of the combustion zone 110 (i.e., along the vertical axis 142) and forms an upper wall of the combustion zone 110. In the exemplary embodiment, the cooking zone 120 overlies the combustion zone 110 (i.e., along the vertical axis 142) and has essentially the same foot print (longitudinal length and transverse width) as the combustion zone 110. As heated air rises to an upper end of the combustion zone 110 it moves adjacent the lower end of the cooking zone 120 to thereby heat the cooking zone 120. However, it will be appreciated that the cooking zone 120 may be arranged relative to the combustion zone 110 in any configuration and/or position, provided the cooking zone 120 is in thermal communication with the combustion zone 110. For example, the cooking zone 120 may overlie the combustion zone 110 but may not be in direct thermal communication with the combustion zone 110 (i.e., a common wall may not separate the cooking zone 120 and the combustion zone 110).

As exemplified in FIGS. 1 and 2, the cooking appliance 100 includes a main body 160. It will be appreciated that the main body 160 may have any suitable configuration, shape, and/or body members. In the exemplary embodiment, the main body 160 includes a combustion housing 162 enclosing a combustion chamber 164 containing the combustion zone 110. Optionally, the combustion housing 162 is an insulated housing, such as a double-walled housing with an insulating gap between double walls on the lateral sides, the front, the back, the bottom, and/or the top of the combustion housing 162 (e.g., the lateral sides, the bottom, and the rear of the exemplified embodiment). Any insulation technique known in the art may be used. The exemplified combustion chamber 164 is a generally cubic chamber having a height 166 (FIG. 2), a width 168 (FIG. 1), and a length 170, although it will be understood that the combustion chamber may be of any suitable shape and/or configuration. The combustion air flow path 150 extends through the combustion chamber 164. The combustion air flow path 150 may extend through the combustion chamber 164 from any end and/or wall to any other end and/or wall, or may extend through the combustion chamber from one end and/or wall to an opposite end and/or wall (e.g., from a front wall to a rear wall, as exemplified).

Optionally, the combustion zone 110 is insulated from an environmental surface (e.g., a counter top or table) on which the cooking appliance 100 rests. While it will be understood that the cooking appliance 100 may have a stand to separate it from an environmental surface, the cooking appliance 100 may not include a tall stand and may be positioned with the combustion zone 110 relatively close to the environmental surface on which the cooking appliance 100 rests, such as with the combustion zone 110 less than 12 inches, less than 5 inches, or less than 3 inches from the surface on which the cooking appliance 100 rest. For example, the cooking appliance 100 may be a counter-top appliance with short legs 172. The cooking appliance 100 may have a bottom end 138 that is insulated to seat on or adjacent an environmental surface, e.g., a counter. That is, the bottom end 138 may include an insulating material between the combustion zone 110 and the bottom surface of the cooking appliance 100, such as a layer of air or fiberglass sandwiched by two walls. As exemplified, the bottom end 138 may include a layer of air 174 sandwiched between the floor of the combustion zone 110 and the bottom surface of the cooking appliance 100.

It will be understood that fuel may be introduced to the combustion zone 110 in any suitable way, such as via a pellet auger from a pellet hopper. However, fuel may be loaded into the combustion zone 110 in batches, such as manually filling a fuel tray as described subsequently.

As exemplified, the combustion zone 110 has an opening, which may be closeable, to allow fuel to be added. As exemplified, an openable door 180 provides access to the combustion chamber 164. In the exemplary embodiment, the combustion zone air inlet 152 is provided in the door 180, although it will be understood that the combustion zone air inlet 152 may also or alternatively be provided elsewhere, e.g., in a lateral wall of the combustion housing 162. It will be understood that the combustion zone may also be accessible through other openings, such as through the upper wall of the combustion housing 162 when a plate 190 forming a cooking surface 192 is removed as exemplified in FIG. 4.

It will be appreciated that, instead of a door 180, a front wall that is fixed in place may be provided. An advantage of the door 180 is that it may be opened to insert fuel. Accordingly, the door 180 may be moveably mounted, e.g., to the combustion housing 162, e.g., pivotally mounted, such that the user may lift the door 180 about a door pivot hinge 182. However, it will be understood that other moveable mountings may also or alternatively be used. For example, the door 180 may be mounted to the combustion housing 162 to swing laterally outward or downward on a pivot hinge or to slide downward, upward or laterally outward on a rail.

The exemplary embodiment of FIGS. 1 and 2 includes a cooking chamber 200 containing the cooking zone 120. The exemplified cooking chamber 200 is an openable chamber bounded by an openable cooking chamber lid 202 (see, e.g., FIG. 3) and a wall (e.g., the plate 190 in the exemplary embodiment) forming the cooking surface 192, although it will be understood that the cooking chamber 200 may be of any suitable shape and/or configuration, such as including one or more stationary lateral, top, or bottom walls. It will be appreciated that a lid may not be provided.

Combustion Zone Fluidically Isolated from Cooking Zone

The following is a description of fluidically isolating the combustion zone 110 and the cooking zone 120 from one another, which may be used by itself or in combination with one or more of the combustion zone separated from the cooking zone by an impermeable plate, the fluid guide channels, grease carried out of the cooking zone, slidably loaded fuel, fuel zones, inlet draft control, rapidly warmed outlet conduit, separate combustion or cooking zones, modular construction, flavor additive, electricity generation, or heat transfer damping, which are set out herein.

In accordance with this aspect, the cooking zone 120 is fluidically isolated from the combustion zone 110. The cooking zone 120 may be fluidically isolated from the combustion air flow path 150 downstream (and, optionally, upstream) of the combustion zone 110. That is, by-products (e.g., ash or gases) generated by combustion in the combustion zone 110 and carried downstream through the combustion air flow path 150 are inhibited or prevented from travelling through the cooking appliance 100 and entering the cooking zone 120. The gases that leave the combustion zone 110 are guided out of the cooking appliance 100 without passing through the cooking zone 120. This aspect may be used by itself or in combination with one or more other aspects of this disclosure.

The cooking zone 120 and the combustion zone 110 may be separated from one another by a single air impermeable wall or plate (e.g., plate 190), as discussed further subsequently. However, it will be understood that the combustion zone 110 and the cooking zone 120 may be arranged in any suitable arrangement provided the combustion zone 110 and the cooking zone 120 are in thermal communication but fluidically isolated. For example, the combustion zone 110 and the cooking zone 120 may be separated by two or more walls, and/or the air flow path 150 may extend through ducting that runs along lateral walls of the cooking zone 120 to carry heat to the cooking zone 120.

The cooking zone 120 may comprise an open or a closed cooking volume 210. If enclosed, then the closed cooking volume 210 may be, or substantially be, enclosed by the cooking surface 192 and the openable lid 202. The closed cooking volume 210 may be substantially all of the interior volume of the cooking chamber 200. The cooking surface 192 is a surface of a lower wall of the cooking zone 120, and optionally may be a surface of an air impermeable plate 190 which separates the cooking and combustions zones 110, 120 as discussed further subsequently.

The closed cooking volume 210 may be an insulated volume, such as surrounded by a double-walled construction with an insulating gap on the lateral sides, the top, the front, the back, and/or the bottom. As exemplified, the lid 202 is a double-walled lid insulating the top, the front, and the lateral sides of the cooking zone 120.

In the exemplified embodiment, the cooking chamber lid 202 is part of the main body 160 and may be opened to access the cooking zone 120 (e.g., to add or remove food items). The lid 202 may be moveably mounted to another portion of the cooking appliance 100, such as pivotally openable about a pivotal connection to another portion of cooking appliance 100, such as another portion of the main body 164. For example, the cooking chamber lid 202 may be pivotally mounted at a rear end to a chimney 220 as exemplified, or pivotally mounted at a lateral edge to the combustion housing 162 to swing open laterally. However, it will be understood that the lid 202 may be otherwise moveably mounted, for example the lid may be slidably mounted to the combustion housing 162 to slide laterally or forwardly on a rail. Optionally, the lid 202 may be removeable, such as by resting loosely on the combustion housing 162 to be lifted off, or removeable after releasing a fastener such as a clip or threaded fastener.

As exemplified, the cooking chamber lid 202 has a rear end that is pivotally mounted to the chimney 220 via a pivotal lid hinge 222. The chimney 220 is positioned at the rear end 134 of the cooking appliance 100, and is, in the exemplary embodiment, positioned rearward of the openable lid 202. The exemplified cooking chamber lid 202 is pivotally mounted to the chimney 220 by the pivot hinge 222 such that a user may lift the lid 202 by raising a front end of the lid 202 (e.g., via a handle 204) and swinging the front end of the lid 202 towards the chimney 220. The exemplary cooking chamber lid 202 may be removed by releasing the pivotal lid hinge 222. The removeable lid 202 may be sized to fit in a dishwasher for cleaning, such as having a width and a length and a height that are each less than 20 inches, less than 15 inches, less than 12 inches, or less than 8 inches.

Optionally, the cooking chamber lid 202 includes a thermometer 224 to sense a temperature under the lid 202 e.g., the temperature of the cooking zone 120. The thermometer 224 may display the temperature on an outside surface of the cooking appliance, such as via a dial 226 as exemplified. Alternatively or in addition, the thermometer 224 may provide the temperature to another component, such as to a controller of the cooking appliance as discussed further subsequently or to a transmission device to send the temperature to an external device (e.g., a tablet or a smart phone).

The combustion zone air outlet 154 may direct combustion by-products away from the closed cooking volume 210. The combustion zone air outlet 154 may be located at an elevation above the closed cooking volume 210. As in the exemplified embodiment, the combustion air flow path 150 may extend through an outlet conduit 230 downstream from the combustion zone 110. The outlet conduit 230 may extend between the combustion chamber 164 and the combustion zone air outlet 154.

The outlet conduit 230 may be and/or be a part of the chimney 220. As exemplified, the combustion air outlet 154 is provided at an upper end of the chimney 220. That is, the outlet conduit 230 may be arranged to carry the combustion by-products from the combustion zone 110 to the top of the chimney 220 above the cooking zone 120. The chimney 220 extends upward to an elevated point above the cooking zone 120 to carry combustion by-products to the elevated point. From the elevated point the by-products (e.g., heated by-products) may disperse (e.g., generally upwardly). Optionally, the chimney 220 is detachable, such as for ease of storage or transport. For example, the chimney 220 may be detachable and sized to fit under the lid 202, such that the chimney 220 may be removed and stored under the lid 202 for storage or transport.

As exemplified, the outlet conduit 230 and/or chimney 220, or a majority of the same, may extend generally perpendicular to the portion of the combustion air flow path 150 that extends through the combustion zone 110. The portion of the combustion air flow path 150 that extends through the combustion zone 110 may extend generally horizontally, while a majority of the outlet conduit 230 and/or chimney 220 extends generally vertically, as exemplified. The exemplified outlet conduit 230 and chimney 220 are positioned opposite the combustion zone air inlet 152 and are positioned at a rear end 134 of the cooking appliance 100. However, it will be understood that the outlet conduit 230 and/or chimney 220 may be positioned at any suitable location on the cooking appliance 100, such as at a lateral side and/or at the front 132. Optionally, the air inlet 152 is opposite the outlet conduit 230 and/or chimney 220 regardless of where the outlet conduit 230 and/or chimney 220 is positioned (e.g., the air inlet 152 is on one lateral side while the outlet conduit 230 is on the opposite lateral side).

Optionally, a cover 240 protects the top of the outlet conduit 230 and/or chimney 220 from, e.g., rain or snow. The cover 240 may be adjustable, such that the cover 240 may be secured to the outlet conduit 230 and/or chimney 220 in one of a plurality of potential positions, including an open position as exemplified in FIGS. 1 and 2 in which the cover 240 is raised to permit the combustion by-products to exit the combustion zone air outlet 154 and a closed position as exemplified in FIG. 7 in which the cover 240 blocks the combustion zone air outlet 154.

Accordingly, it will be appreciated that combustion by products produced in the combustion zone 110 are directed away from the cooking zone 120.

Combustion Zone Separated from Cooking Zone by an Impermeable Plate

The following is a description of an air impermeable plate separating the combustion zone 110 and the cooking zone 120, which may be used by itself or in combination with one or more of the combustion zone isolated from the cooking zone, the fluid guide channels, grease carried out of the cooking zone, slidably loaded fuel, fuel zones, inlet draft control, rapidly warmed outlet conduit, separate combustion or cooking zones, modular construction, flavor additive, electricity generation, or heat transfer damping, which are set out herein.

In accordance with this aspect, an air impermeable plate 190 extends between the cooking zone 120 and the combustion zone 110. The air impermeable plate 190 separates the cooking zone 120 from combustion by-products generated in the combustion zone 110, such as ash and gases that carry the ash. The air impermeable plate 190 may form a lower wall of the cooking zone 120 and an upper wall of the combustion zone 110. The air impermeable plate 190 may form the cooking surface 192 of the cooking zone 120. This aspect may be used by itself or in combination with one or more other aspects of this disclosure.

Figure 6:
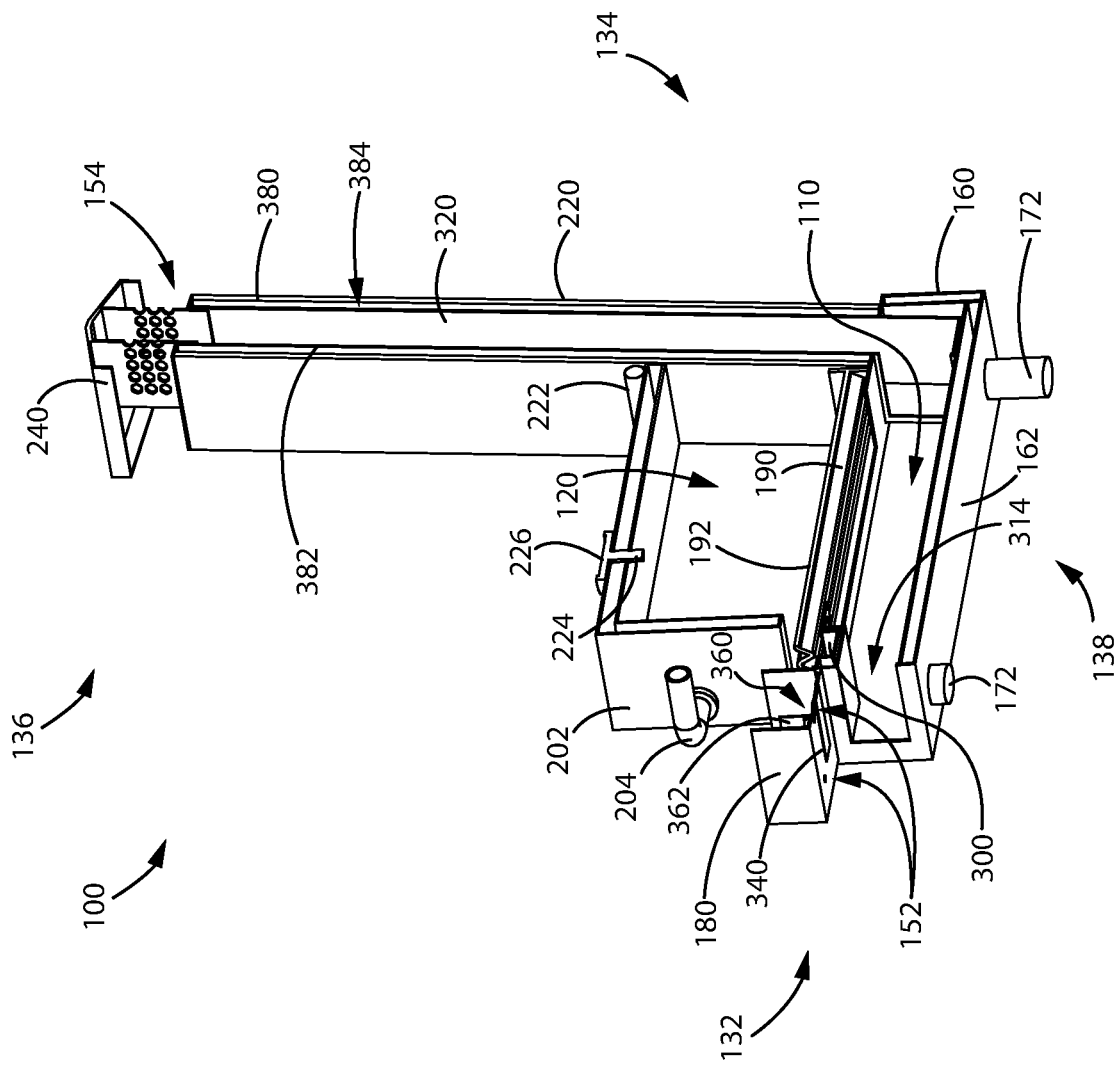
FIG. 6 is a second cross-sectional view (along a front to rear axis) of the cooking appliance of FIG. 1.

FIG. 6 exemplifies the cooking zone 120 separated from the combustion zone 110 by a single plate 190. That is, a cooking zone surface 250 of the plate 190 bounds the cooking zone 120 while an opposite combustion zone surface 252 of the plate 190 bounds the combustion zone 110. In the exemplary embodiment, the cooking zone 120 overlies the combustion zone 110, and the upper surface of the plate 190 bounds the cooking zone 120 while the lower surface of the plate 190 bounds the combustion zone 110.

The plate 190 is an air impermeable plate. In other words, the plate 190 is a continuous plate without apertures or perforations extending from the cooking zone surface 250 to the combustion zone surface 252 through which the hot gases exiting the combustion zone 110 may pass into the cooking zone 120. The plate 190 forms a barrier to the hot gases exiting the combustion zone 110, and so prevents the hot gases and the other by-products carried by the hot gases (e.g., ash) from traveling into the cooking zone 120. The plate 190 may cooperate with other portions of the cooking appliance 100 (e.g., the side walls of the combustion zone 110 and the chimney 220, which carries the hot gases to an elevated point) to prevent combustion by-products from entering the cooking zone 120.

The plate 190 may form the cooking surface 192 of the cooking zone 120 (i.e., the cooking surface 192 may support food in the cooking zone 120). Alternately a cooking surface may be provided spaced above the cooking zone surface 250 of plate 190).

The plate 190 permits heat to pass through from the combustion zone 110 to the cooking zone 120. Heat may be carried by, e.g., infrared radiation and/or conduction. The plate 190 may conduct heat from hot gases at the combustion zone surface 252 to gases and/or food on the cooking zone side 250. The plate 190 may be transparent to infrared radiation and/or emit infrared radiation. For example, the plate 190 may be a metal plate that is conductive and also emits infrared radiation when heated. The plate 190 may be a metal plate formed from, or substantially from, aluminum, copper, and/or stainless steel. The plate 190 may be a cast or stamped plate.

Optionally, an inner surface of the cooking chamber 200 may also reflect infrared radiation. For example, the lid 202 or a liner thereof may reflect infrared radiation emitted by the plate 190 or infrared radiation passing through the plate 190 back into the cooking zone 120. The lid 202 or a liner thereof may have, e.g., a polished aluminum coating to reflect infrared radiation.

It will be appreciated that, as exemplified the plate 190 is a single layer. However, optionally, plate 190 may have a multilayer construction wherein each layer abuts an underlying layer. Alternately, the plate 190 may be honeycombed to reduce the rate of heat conduction through the plate 190.

Fluid Guide Channels

The following is a description of channels to guide fluids in the combustion zone 110 and/or the cooking zone 120, which may be used by itself or in combination with one or more of the combustion zone isolated from the cooking zone, the combustion zone separated from the cooking zone by an impermeable plate, grease carried out of the cooking zone, slidably loaded fuel, fuel zones, inlet draft control, rapidly warmed outlet conduit, separate combustion or cooking zones, modular construction, flavor additive, electricity generation, or heat transfer damping, which are set out herein.

In accordance with this aspect, a surface of the combustion zone 110 and/or a surface of the cooking zone 120 includes channels to guide fluid flow. For example, the combustion zone 110 may include gas collection channels 260 in a side wall and/or upper wall to guide the flow of hot gases. The cooking zone 120 may include drainage channels 270 in a lower wall, e.g., the cooking surface, to guide the flow of liquid produced during cooking (e.g., grease). If the cooking zone 120 is separated from the combustion zone 110 by the plate 190, then the channels may be formed in the combustion zone surface 252 and/or in the cooking zone surface 250 of the plate 190. The plate 190 may be a corrugated plate 190, in that the channels in one surface correspond to ridges in the opposite surface. This aspect may be used by itself or in combination with one or more other aspects of this disclosure.

Fluid guide channels are arranged such that fluids in the channels are encouraged to travel along the channels towards an end of the zone for which they are included. That is, the channels are arranged to encourage a flow the fluids in the channels to direct the fluid towards a desired location. For example, the channels may be generally linear and may be sloped such that fluids travel along the channels towards one of the ends of the sloped channels. As exemplified in FIGS. 6, 7, and 8, the combustion zone 110 may include sloped gas collection channels 260 in an upper end of the combustion zone 110 to collect hot gases and guide the hot gases towards a raised end, e.g., towards an outlet conduit inlet 232 of the outlet conduit 230. Also exemplified are sloped drainage channels 270 in the cooking surface 192 to guide liquid produced during cooking towards a low end of the drainage channels 270, e.g., towards a collection zone 280.

It will be understood that the fluid guide channels (e.g., drainage channels 270 and gas collection channels 260) may be arranged in any suitable configuration. However, in some examples, the fluid guide channels are arranged in sets of generally parallel channels. In other words, the fluid guide channels may be distinct channels running parallel to one another along a portion of a wall such that contained fluids in one channel are kept separate from fluids in another. As exemplified in FIG. 8, the drainage channels 270 and the gas collection channels 260 are each a set of a plurality of parallel channels that extend along a longitudinal axis to prevent fluid in one channel from obstructing fluid in another. The gas collection channels 260 may also guide (e.g., spread) hot gases along the entire upper surface of the combustion zone 110 when hot gases are generated only in one or a few regions of the combustion zone 110, as will be discussed further subsequently.

The fluid guide channels may have a generally consistent depth and/or cross-sectional area along their length, as exemplified. However, it will be understood that channels may alternatively have a varying depth and/or cross-sectional area. For example, gas collection channels 260 may become progressively smaller towards the outlet conduit inlet 232 to encourage hot gases to exit the channel 260, or drainage channels 270 may become progressively larger towards the collection area 280 to accommodate an accumulated quantity of liquid produced during cooking.

Where the impermeable plate 190 separates the combustion zone 110 and the cooking zone 120, the gas collection channels 260 in a lower surface of the plate 190 may correspond to ridges between the drainage channels 270 in an upper surface of the plate 190, and vice versa. For example, the plate 190 may be a corrugated plate, as exemplified in FIG. 8. The exemplified cooking surface 192 has a plurality of corrugations 290. The corrugations 290 have a plurality of peaks 292 and a plurality of valleys 294 (i.e., drainage channels 270). The lower surface of the peaks 292 comprises part of an outer wall of the combustion zone 110 (i.e., the gas collection channels 260) whereby the lower surface of the peaks 292 is exposed to combustion products when combustion occurs in the combustion zone 110.

Figure 8:
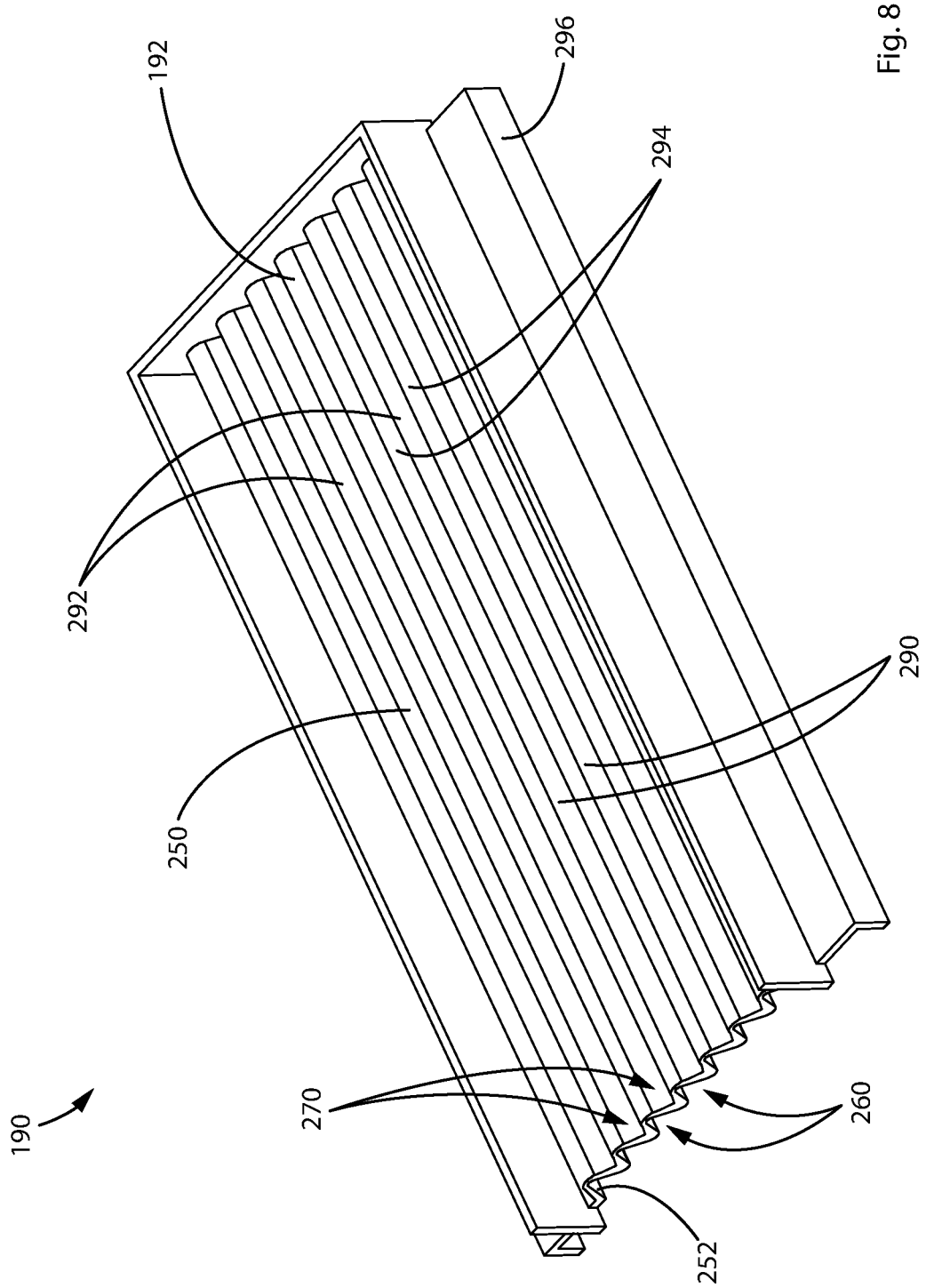
FIG. 8 is a front top perspective view of the impermeable plate of the cooking appliance of FIG. 1.

Optionally, the peaks 292 of the corrugations 290 have a thickness that is less than a thickness of the valleys 294, as exemplified in FIG. 8. The heat transfer between the combustion zone 110 and the cooking zone 120 may be greater at the peaks 292 than at the valleys 294, e.g., to encourage cooking of food supported by the peaks 292 of the corrugations 290.

While the fluid flow channels may be horizontally disposed in use, the fluid flow channels (e.g., corrugations 290) may alternatively extend downwardly relative to a horizontal plane (e.g., plate 190 may be sloped). The channels may extend downwardly towards one lateral side, or as exemplified in FIG. 10, the plate 190 may extend downwardly and forwardly. In terms of flow direction, the drainage channels 270 may extend downwardly and forwardly while the gas collection channels 270 may extend upwardly and rearwardly towards the outlet conduit 230 to encourage gases to flow through the channels towards the chimney 220.

The fluid flow channels may extend at an angle of between 5° and 25°, between 10° and 20°, or about 15° from a horizontal plane. The gas collection channels 260 and the drainage channels 270 may have the same slope, e.g., if they are formed in a corrugated plate 190 as exemplified. As exemplified, the plate 190 may extend at an angle to the horizontal, with the channels 260, 270 extending at the same angle as peaks 290 of the plate 190. However it will be understood that in other examples the channels 260, 270 and the peaks 290 of the plate 190 may extend at different angles, e.g., if the channels 260, 270 have a varying depth and/or width.

Figure 5:
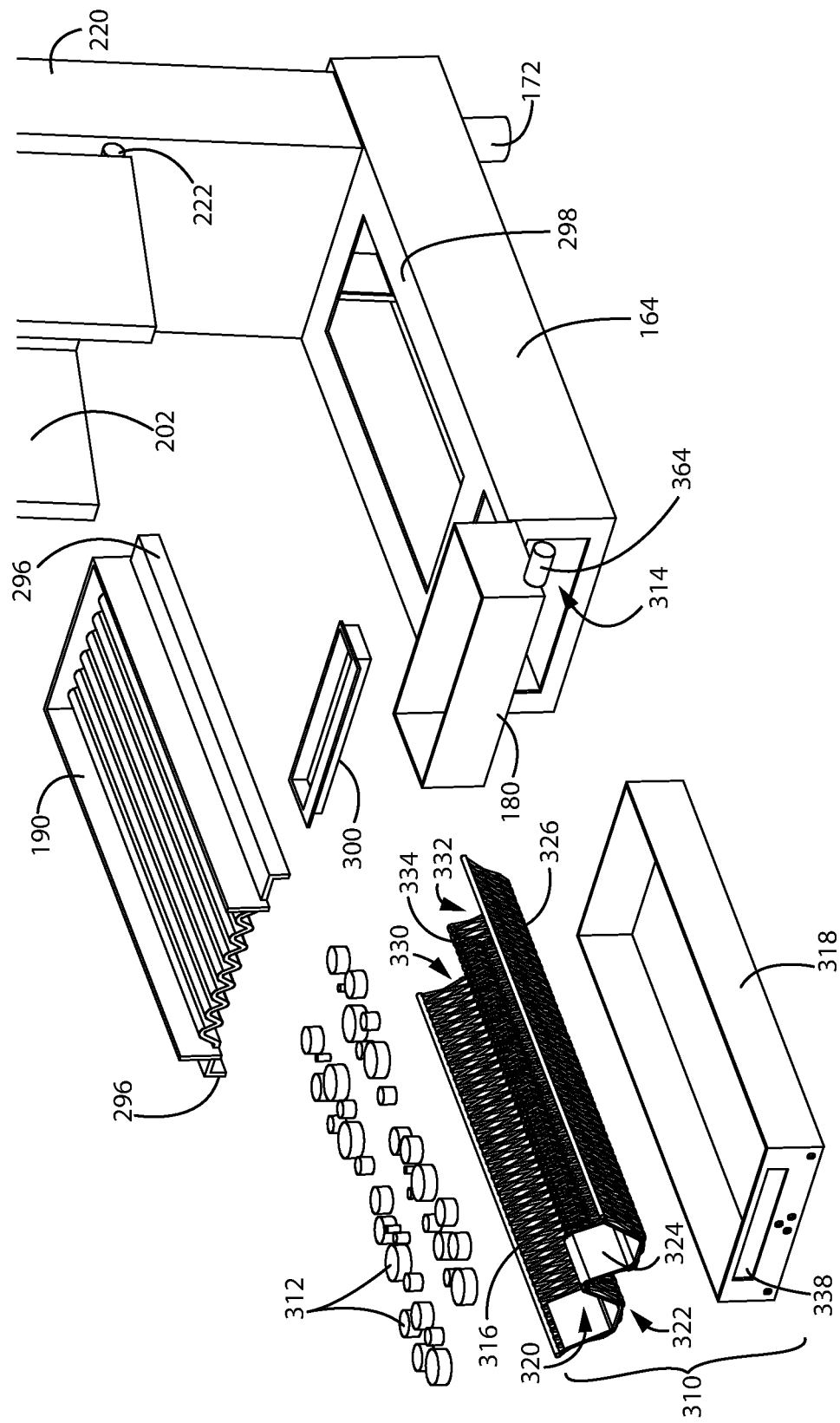
FIG. 5 is an exploded view of the cooking appliance of FIG. 1.

As exemplified in FIGS. 5 and 6, the angle of the channels 260, 270 and/or the plate 290 may be due to the angle of the surface of the cooking appliance 100 on which the plate 190 rests. The exemplified plate 190 is secured to, or removably positionable on, a retainer structure 296 which rests on the combustion housing 162. The illustrated combustion housing 162 has a supporting surface 298 that is angled to provide the draft angle of the of the channels 260, 270 (i.e., the channels 260, 270 and the retainer structure 296 are not angled relative to one another). This may be achieved by the orientation of the cooking appliance 100 when seated on a horizontal counter. As exemplified in FIG. 10, supporting surface 298 is angled due to difference in the sizes of the front legs 172 and the rear legs 172. Alternatively or additionally the retainer structure 296 of the plate 190 may be angled relative the channels 260, 270 such that at least part of the slope of the channels is due to the relative difference in angle between the channels and the retainer structure 296.

It will be understood that fluid flow channels may be formed in any suitable way, and may not be the result of corrugations in a plate. For example, fluid flow channels may be formed between fins extending from a wall, such as generally vertical fins extending from the upper surface of the plate 190 to form drainage channels 270 therebetween.

Grease Carried out of Cooking Zone

The following is a description of a cooking appliance 100 configured to direct the liquid produced during cooking out of the cooking zone 120, which may be used by itself or in combination with one or more of the combustion zone isolated from the cooking zone, the combustion zone separated from the cooking zone by an impermeable plate, the fluid guide channels, slidably loaded fuel, fuel zones, inlet draft control, rapidly warmed outlet conduit, separate combustion or cooking zones, modular construction, flavor additive, electricity generation, or heat transfer damping, which are set out herein.

In accordance with this aspect, the cooking appliance 100 includes a surface, e.g., the cooking surface 192, shaped to carry liquids produced during cooking, e.g., grease, away from the cooking zone 120. The liquid-carrying surface may be a liquid-impermeable surface such that liquids produced during cooking do not pass through the surface (e.g., do not fall into the combustion zone 110). The liquid-carrying surface may have a region of lower elevation such that liquids are encouraged by gravity to flow towards the region of lower elevation, and the liquid-carrying surface may be arranged such that this flow of liquid moves the liquid away from the cooking zone 120. For example, the liquid-carrying surface may be the surface of an angled plate 190 such that liquids flow down the plate 190 towards a low end, and the low end may be arranged at an edge of the cooking zone 120. The liquid-carrying surface may direct the liquid to a collection region, which may be within the cooking chamber adjacent the cooking zone or may be outside the cooking chamber. For example, the liquid-carrying surface may be arranged to direct the liquid into a drip tray 300 that is positioned outside the cooking zone 120. This aspect may be used by itself or in combination with one or more other aspects of this disclosure.

Figure 3:
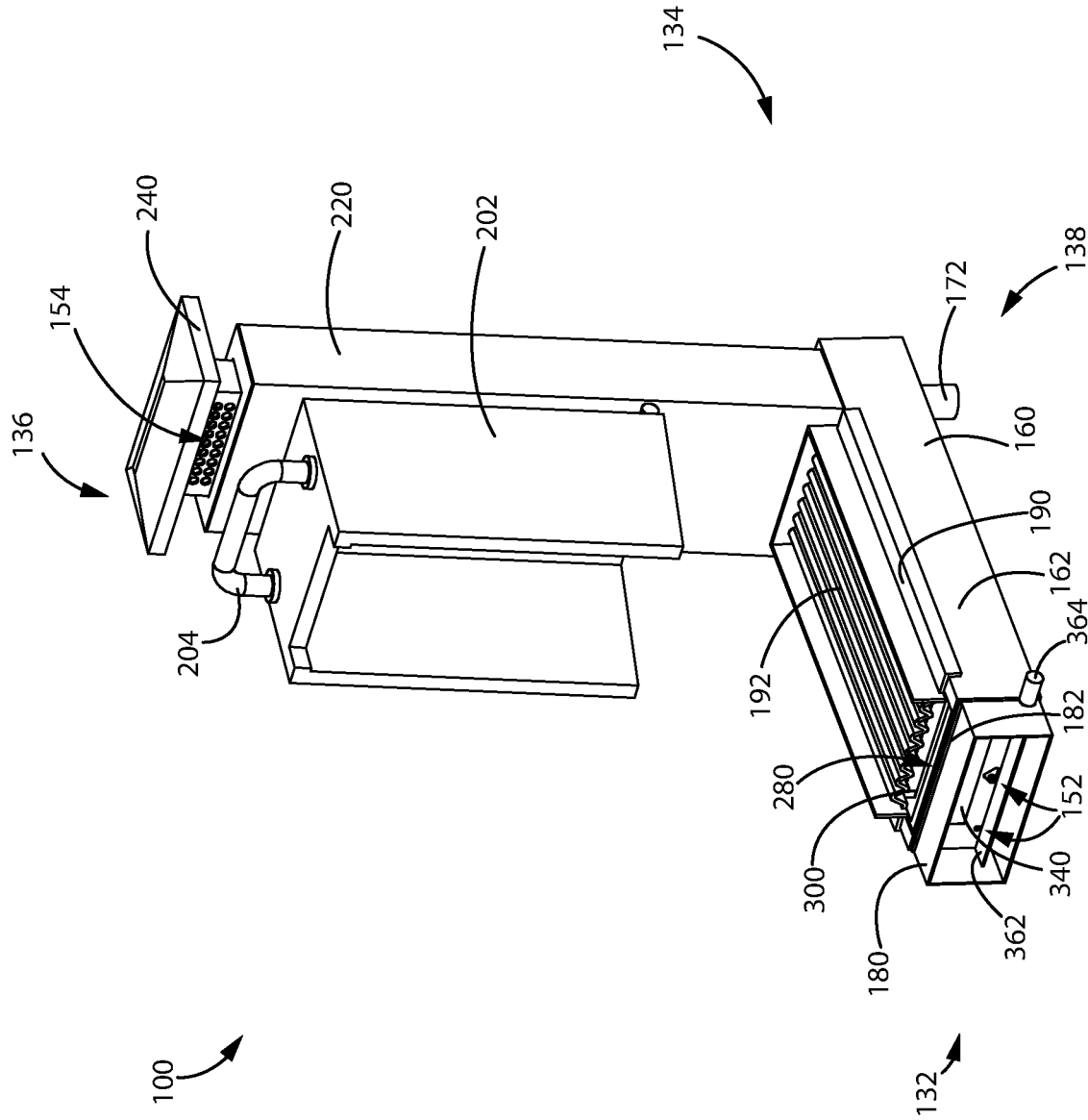
FIG. 3 is a front top perspective view of the cooking appliance of FIG. 1 with a cooking zone lid opened.
Figure 4:
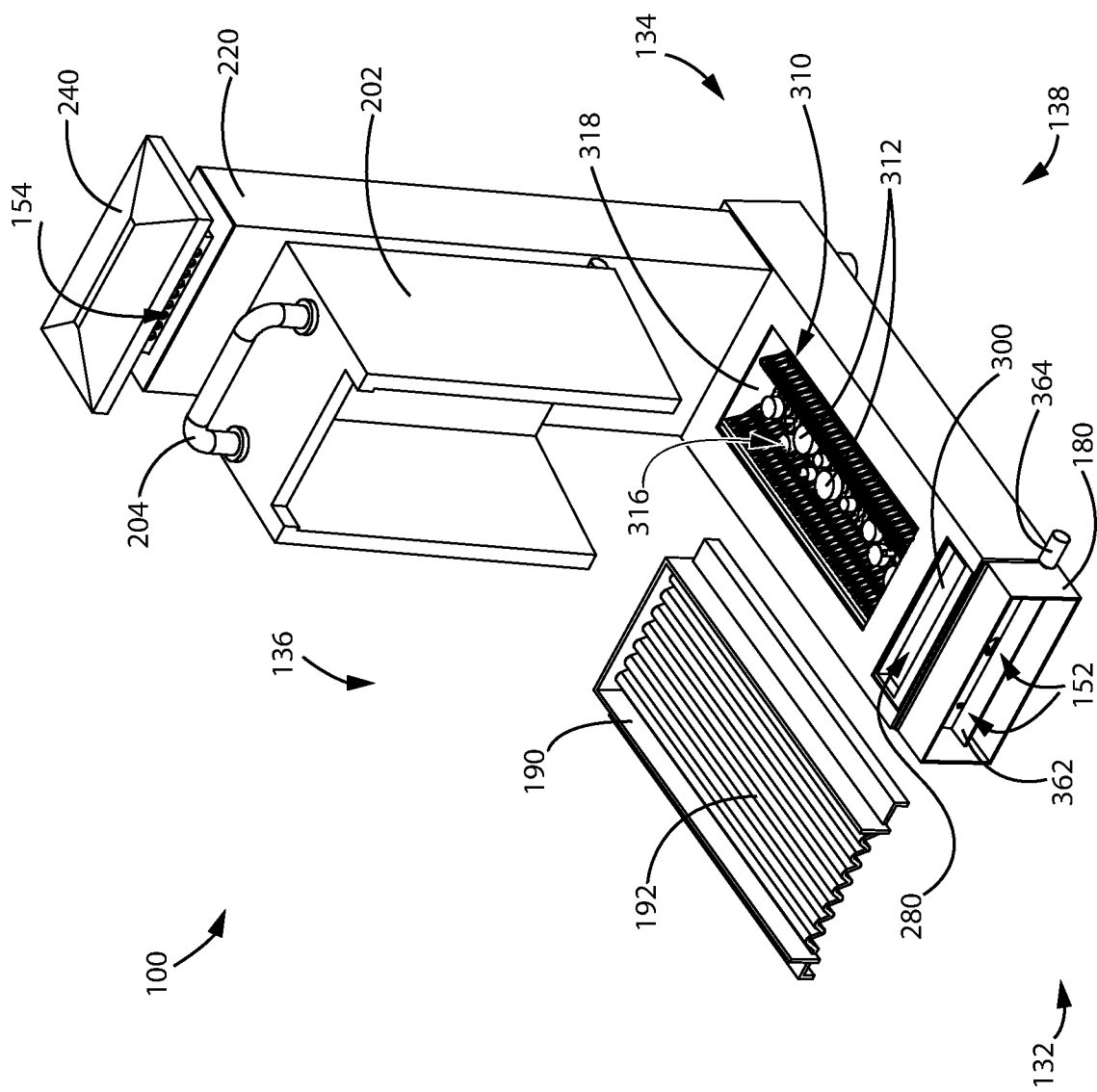
FIG. 4 is a front top perspective view of the cooking appliance of FIG. 1 with the cooking zone lid opened and an impermeable plate raised.

As exemplified in FIGS. 3 and 4, the liquid-carrying surface may be the cooking surface 192. It will be understood that the liquid carrying surface may alternatively be a separate surface, such as a plate positioned under a food-carrying grate. The liquid-carrying surface (e.g., the cooking surface 192) extends downwardly towards a liquid collection region 280 that is external to the cooking zone 120, as exemplified in FIG. 2. The illustrated collection region 280 is also external to the cooking chamber 200 (i.e., when the optional lid 202 is closed, the collection region is exterior to the cooking chamber 200 located internal of the lid 202), and the cooking chamber 200 is in flow communication with the collection region (e.g., an opening in the cooking chamber walls allows liquid to pass from the cooking chamber 200 to the collection region 280). As exemplified, a gap between the lid 202 and the cooking surface 192 allows liquid out of the cooking zone 120 into the drip tray 300.

As exemplified, the liquid collection region 280 may be recessed from the cooking region 120 in a drip tray 300.

It will be understood that the collection region 280 (e.g., the drip tray 300) may be proved at any suitable location. For example, the collection region 280 may be provided on an exterior surface of the cooking appliance 100, although it will be understood that the collection region 280 may optionally be covered by one or more components of the main body 160 (e.g., if the lid 202 extends forwardly over the collection region 280). Optionally, the collection region 280 may be located at any location that is external to the cooking chamber 200 and, optionally, if drainage channels 270 are provided and/or the plate 190 is sloped, the collection region 280 is located at the lower end of the drainage channels 270 or the plate 190.

For example, the collection region 280 may be external to the cooking appliance 100. As exemplified in FIG. 2, the collection region 280 may be in the drip tray 300, and the drip tray 300 may be external to the cooking appliance 100.

As exemplified in FIGS. 3 and 4, the drip tray 300 is arranged to collect liquid from the liquid-carrying surface (e.g., the cooking surface 192), e.g., from the drainage channels 270. The exemplified drip tray 300 extends along the front edge of the cooking surface 192 to receive liquid from each of the drainage channels 270, and the exemplified drainage channels 270 are directed towards the drip tray 300 (i.e., extending generally straight towards the collection region 280). As exemplified, the drainage channels 270 may extend forwardly-rearwardly. Accordingly, grease may flow down drainage channels 270 and fall into the collection region 280.

The collection region 280 may be arranged adjacent any edge of the cooking surface 192 (e.g., one or more edges). The collection region 280 may be opposite the end of the lid 202 that is secured to the main body 160. As exemplified, the collection region 280 may be at a front end 132 of the upper surface of the main body 160 of the cooking appliance 100, forward of the cooking zone 120. It will be appreciated that the collection region 280 may also or alternatively be at another side of the cooking zone 120, such as at a rear end 134 if the cooking surface 192 slopes downwardly toward the rear 134 rather than the front 132.

It will be appreciated that the collection region 280 need not be on an upper surface of the cooking appliance but may be located at any elevation that is below, e.g., a lower end of plate 190 or drainage channels 270. For example, as exemplified in FIGS. 9 and 10, the collection region 280 may be below the combustion zone 110.

Optionally, the drip tray 300 is a removeable tray, e.g., for cleaning. Accordingly, the drip tray 300 may be removably mounted to the cooking appliance. As exemplified in FIG. 5, the drip tray 300 may rest loosely on the main body 160 and may be lifted out. That is, the drip tray 300 is not fastened to the main body 160 in the exemplary embodiment, although it will be appreciated that the drip tray 300 may alternatively be secured to the main body 160 by, e.g., threaded fasteners or clips.

Figure 9:
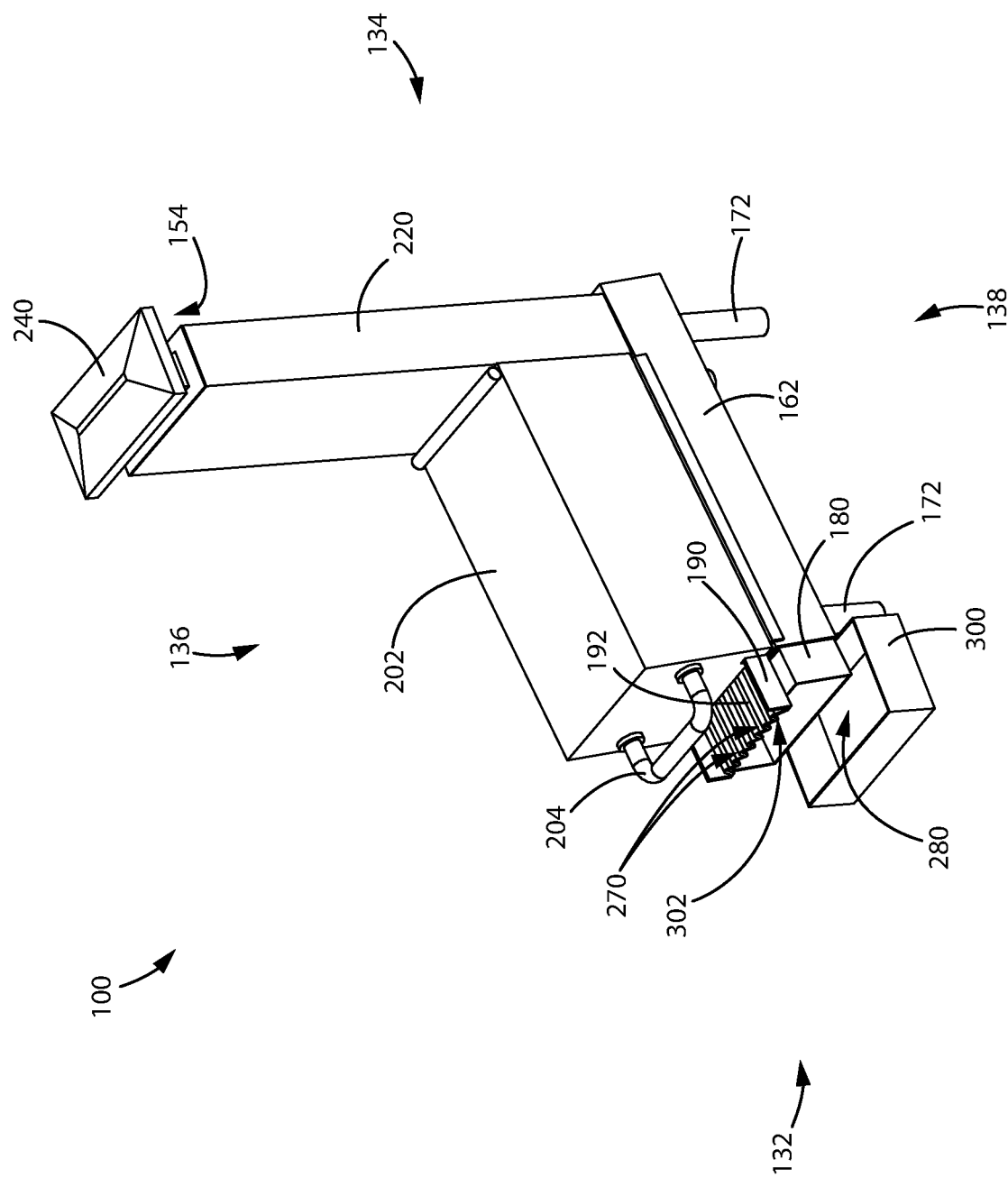
FIG. 9 is a front top perspective view of a second cooking appliance.
Figure 10:
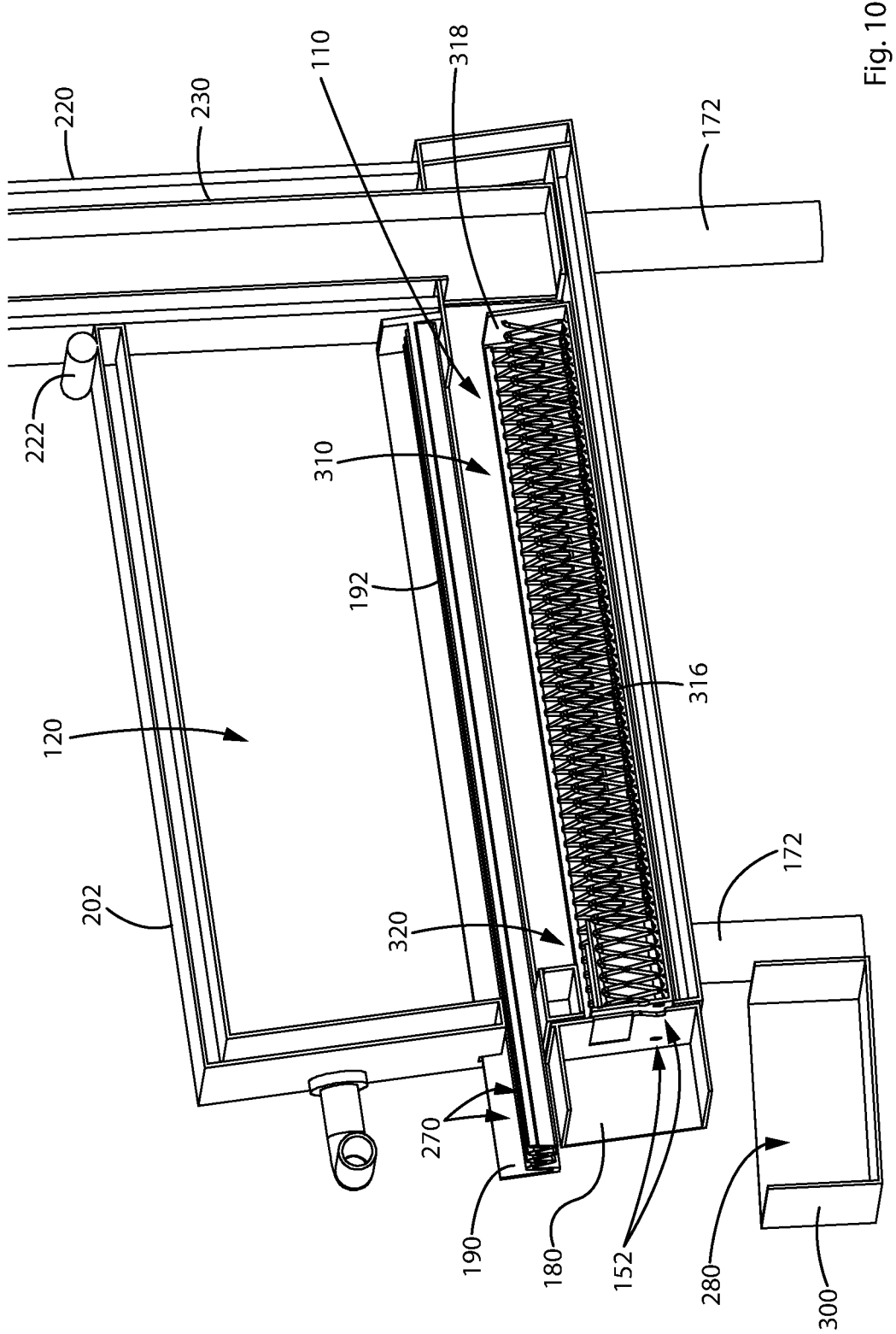
FIG. 10 is a cross sectional view (along a front to rear axis) of the cooking appliance of FIG. 9.

Alternatively, as exemplified in FIGS. 9 and 10, the drip tray 300 may not be mounted to the cooking appliance 100 at all. That is, the drip tray 300 may not be secured to the cooking appliance 100 nor rest on the cooking appliance 100. As exemplified in FIGS. 9 and 10, the collection region 280 may be in a drip tray 300 that is positionable on the surface on which the cooking appliance is resting (e.g., a counter) underneath an outlet end 302 of the drainage channels 270. As a result, the liquid from the cooking surface 192 may drain off of the cooking appliance 100 and into the external collection region 280.

The exemplary drip tray 300 of FIGS. 9 and 10 is positioned at a front of the cooking appliance 100 below the outlet end 302 of the drainage channels 270, however it will be understood that the outlet end 302 may also or alternatively be to a lateral side or a rear of the cooking zone 120. The drainage channels 270 may run between lateral sides rather than between the front 132 and the rear 134, and the outlet end 302 may be at one or both lateral sides, with the drip tray 300 positioned beneath the outlet end(s) 302. Optionally, the drainage channels 270 also or alternatively may have an outlet end 302 at rear end 134, such as outlet ends 302 at each of the front and rear ends 132, 134 (e.g., if the chimney 220 is at a lateral side or if the outlet end 302 is above a diversion channel that carries liquid around or to a side of the chimney 220).

Slidably Loaded Fuel

The following is a description of slidably loaded fuel, which may be used by itself or in combination with one or more of the combustion zone isolated from the cooking zone, the combustion zone separated from the cooking zone by an impermeable plate, the fluid guide channels, grease carried out of the cooking zone, fuel zones, inlet draft control, rapidly warmed outlet conduit, separate combustion or cooking zones, modular construction, flavor additive, electricity generation, or heat transfer damping, which are set out herein.

In accordance with this aspect, fuel may be inserted into the combustion zone 110 through a lateral opening. The fuel may be slid into the combustion zone 110 through the lateral opening, such as via a fuel tray 310 slid into the combustion zone 110 through the lateral opening. The fuel tray 310 may hold solid fuel, such as pellets. Optionally, the fuel tray 310 is sized to hold at least 20 grams, at least 50 grams, or at least 100 grams of fuel pellets. This aspect may be used by itself or in combination with one or more other aspects of this disclosure.

As exemplified in FIG. 6, the combustion zone 100 is contained in the combustion chamber 164. A lateral access opening 312 provides access to the combustion zone 110 when the door 180 is open. As exemplified in FIG. 7, fuel 312 is slidably receivable in the combustion zone 110, e.g., via a fuel tray 310. The fuel 312 is slidably receivable in the combustion zone 110 through the access opening 314. In the illustrated example, the fuel 312 is slidably received in the same end as the combustion zone air inlet 152 and opposite the position of the chimney 220 (i.e., slidably received in the front end 132), but it will be understood that the fuel 312 may also or alternatively slidably received in any other end or side of the combustion zone 110. As exemplified in FIG. 7, the fuel tray 310 may be slid into the combustion zone 110 and positioned under the cooking zone 120 during combustion of the fuel 312 on the tray 310.

It will be understood that the fuel tray 310 may be of any suitable shape able to hold solid fuel. For example, the fuel tray 310 may simply be a fuel grate that can be slid into the combustion zone 110. However, as exemplified in FIG. 5, the fuel tray 310 may include a fuel grate 316 and an ash container 318. The exemplified ash container 318 is an open-topped dish with apertures in the front wall to allow for air to pass through (e.g., from the combustion zone air inlet 152). The apertures in the front wall of the ash container 318 may be aligned with air passages through the fuel tray 310, such as aligned with openings between the fuel grate 316 and the ash container 318 where the fuel grate 316 holds the fuel away from the ash container 318. Aligning the apertures in the front wall of the ash container 318 with the air passages may allow for improved control of air flow through the fuel tray 310. Optionally, the front wall of the ash container 318 does not have apertures aligned with fuel in the fuel tray 310. That is, areas of the fuel tray 310 that will container fuel, such as areas where the grate 316 will hold the fuel within the ash container 318, may be shielded from direct air flow. However, it will be understood that the ash container may be any container shaped to capture falling ash, such as a simple sheet under the fuel grate 316 or a sheet with raised lateral walls but without a front wall as exemplified in FIGS. 19 and 20 (e.g., an open front to allow for unobstructed air flow). For example, the arrangement of apertures that form the combustion zone air inlet 152 may be sufficient to control air flow patterns within the combustion zone 110.

Fuel 312 is received on the fuel grate 316 for combustion in the combustion zone 110, and the ash container 318 is arranged under the fuel grate 316 to catch ash falling from the fuel grate 316 during combustion. The fuel grate 316 may include a metal frame 326 with apertures therethrough to allow ash to fall away from the fuel 312 and air to pass through to the fuel 312, and the metal frame 326 may be a wire frame as exemplified in FIG. 5. Optionally, the fuel grate 316 includes an air by-pass region 320 at a first end 322. The air by-pass region 320 is a portion of the fuel grate 316 with less apertures to encourage air to move pass the end 322 towards fuel 312 positioned farther down the fuel grate 316. As exemplified, the air by-pass region 320 may be a portion of the fuel grate 316 without any apertures therethrough, such as a portion to which a sheet 324 (e.g., a metal plate) has been attached to the wire frame 326 to cover the apertures. The air by-pass region 320 may be at an end of the fuel grate 316 such that it may be positioned adjacent the combustion zone air inlet 152.

The fuel tray 310 allows for air flow to feed combustion of the fuel 312. The fuel grate 316 may hold the fuel above the floor of the combustion zone 110. In other words, an air passage or gap may extend through the combustion zone 110 below the fuel 312 when the fuel tray 310 is installed. The fuel grate 316 may also hold the fuel 312 away from the lateral sides of the combustion zone 110. As exemplified, the fuel grate 316 may include sides recessed inwardly from the sides of the combustion zone 110, i.e., recessed inwardly from the sides of the ash container 318. The sides of the fuel grate 316 may be angled as illustrated such that an upper end of a lateral side of the grate 316 is nearer the lateral side of the combustion zone 110 than a lower end of the same lateral side of the grate 316. The fuel grate 316 may also hold the fuel 312 below a ceiling of the combustion zone 110. As exemplified, the fuel grate 316 may hold the fuel 312 spaced from the lower side of the plate 190 such that air may flow over the fuel 312.

Optionally, the grate 316 separates the fuel into a plurality of fuel groupings. As exemplified in FIG. 5, the fuel grate 316 includes a first region 330 separated from a second region 332 by a raised barrier 334. The raised barrier 334 may include an air flow passage extending therethrough to pass air to the fuel regions 330, 332 on either side.

Optionally, a window 338 may be included to allow a user to view an interior of the fuel tray 310. The exemplified fuel tray 310 includes a window 338 in a lateral wall of the fuel tray 310 such that a user may view the interior of the fuel tray 310 through the window 338 of the fuel tray 310 and through a window 340 of the combustion housing 162 in a lateral wall of the combustion housing 162. The fuel tray window 338 may be positioned to be aligned with a window 340 (see, e.g., FIG. 3) in the combustion housing 162 when the fuel tray 310 is slidably received in the combustion housing. The exemplified tray window 338 is in a front wall of the fuel tray 310 to correspond to a housing window 340 in a front wall of the combustion housing 162 (i.e., the door 180).

Fuel Zones

The following is a description of distinct fuel zones within the combustion zone 110, which may be used by itself or in combination with one or more of the combustion zone isolated from the cooking zone, the combustion zone separated from the cooking zone by an impermeable plate, the fluid guide channels, grease carried out of the cooking zone, slidably loaded fuel, inlet draft control, rapidly warmed outlet conduit, separate combustion or cooking zones, modular construction, flavor additive, electricity generation, or heat transfer damping, which are set out herein.

In accordance with this aspect, fuel 312 received in the combustion zone 110 is arranged in distinct fuel zones such that a user is able to select which fuel zones are used. Fuel zones may be arranged along the length of a combustion zone 110 and/or fuel tray 310. An ignition region and/or air inlet region may be at one end of the combustion zone 110 and/or fuel tray 310, with the fuel zones arranged along the length of the combustion zone 110 and/or fuel tray 310 progressively farther from the ignition region and/or air inlet region. An advantage of this design is that, if a small amount of food is to be cooked, then only part of a fuel tray may be provided with fuel. This aspect may be used by itself or in combination with one or more other aspects of this disclosure.

Figure 7:
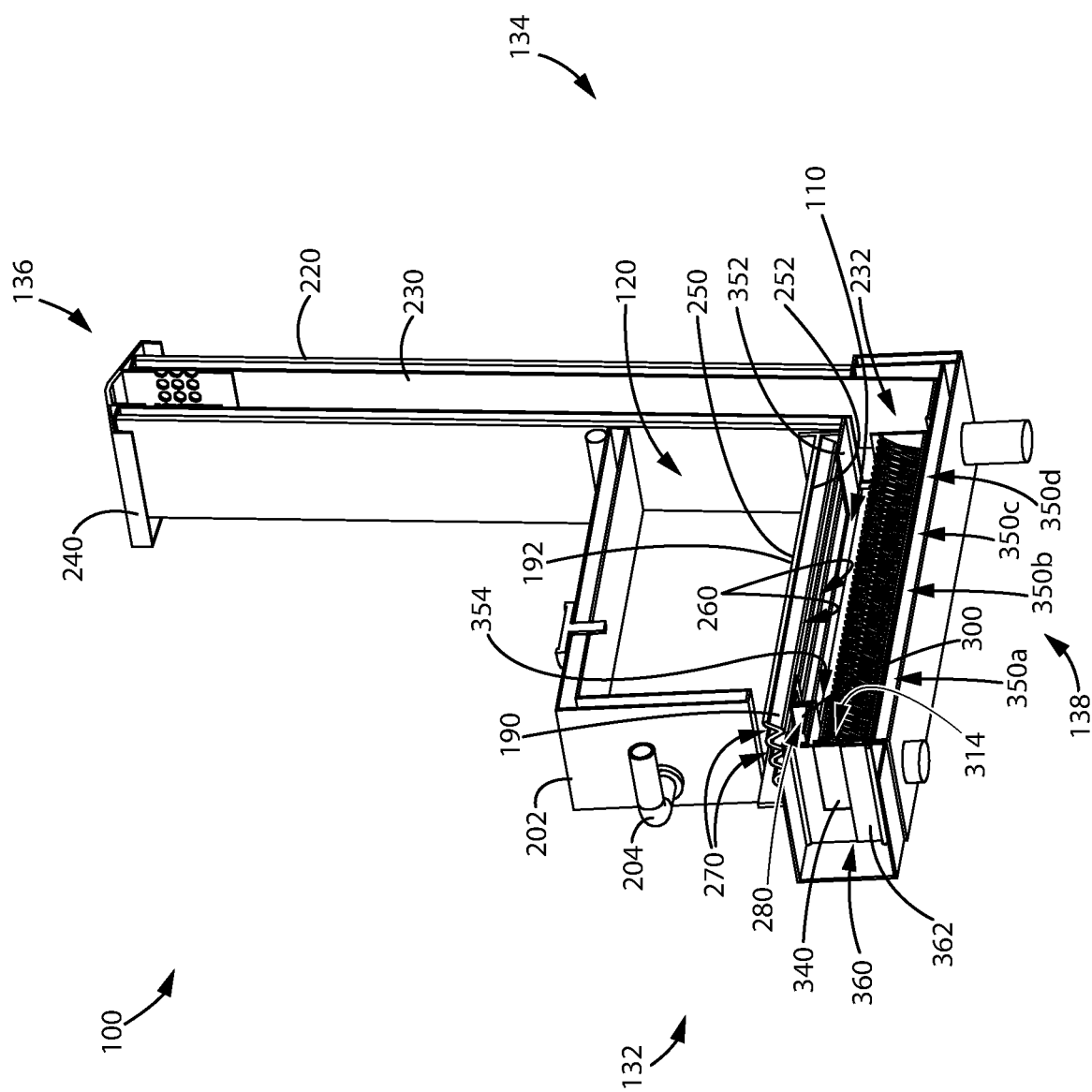
FIG. 7 is a third cross-sectional view (along a front to rear axis) of the cooking appliance of FIG. 1.

As exemplified in FIG. 7, the cooking appliance 100 includes a plurality of fuel zones 350. The exemplified cooking appliance includes first, second, third, and fourth fuel zones 350a, 350b, 350c, 350d, although it will be understood that the cooking appliance 100 may include more or less fuel zones. The fuel zones 350a, 350b, 350c, 350d are arranged sequentially along the length of the combustion chamber 164. That is, the first fuel zone 350a is forward of the second fuel zone 350b, the second fuel zone 350b is forward of the third fuel zone 350c, and the third fuel zone 350c is forward of the fourth fuel zone 350d. These fuel zones may be separated from each other by walls, which may extend transverse to the longitudinal axis 140.

It will be appreciated that each fuel zone 350 may have the same axial length and therefore, a fuel tray 310 may be divided into 3, 4, 5, 6, 7 or more equal sized fuel zones 350. Therefore, the first fuel zone 350a, which may be the ignition zone 354, may be only, e.g., 10, 15, 20 or 25% of the length of a fuel tray and therefore only, e.g., 10, 15, 20 or 25% of the fuel capacity of the fuel tray 310.

It will be appreciated that the fuel zones 350a, 350b, 350c, 350d may be sequentially farther from the combustion zone air inlet 152. That is, fresh air drawn into the combustion zone 110 may pass through the first fuel zone first 350a, the second fuel zone 350b second, and so on. In other words, the fuel zones may be arranged sequentially along the air flow path 150 through the combustion zone 110. For example, the second fuel zone 350b may be further along the air flow path 150 within the combustion zone 110 than the first fuel zone 350a. That is, air may pass through the first fuel zone 350a before reaching the second fuel zone 350b. Air flow through the combustion zone 110 may encourage flames to spread from the first fuel zone 350a to the second fuel zone 350b such that combustion proceeds along the combustion zone 110 to the second fuel zone 350b, from the second 350b to the third 350c, and so on.

It will be appreciated that solid fuel pellets may be provided in some or all of the fuel zones. Optionally, the cooking surface may be provided with markings corresponding to the fuel zones. Accordingly, a user may determine, for example, how much of the cooking surface will be required and only provide fuel to the fuel zones under that part of the cooking surface.

Accordingly, the fuel 312 may be organized in an elongated arrangement of solid fuel pieces such that combustion may proceed sequentially from one end of the elongated arrangement to the other. For example, if the ignition of one cooking zone (e.g., front cooking zone 350a) produces a draft of air through the combustion zone 110, the hot combustion basses travelling through the combustion zone 110 may ignite fuel in other fuel zones. Thus, for example, once a first zone is ignited (e.g., fuel zone 350a), the combustion in the first zone may cause the adjacent zone to combust (e.g., fuel zone 350b) which, in turn, may cause the next adjacent zone to combust (e.g., fuel zone 350c).

The gas collection channels 260 may assist in dispersing the generated hot gases over the ceiling of the combustion zone 110, i.e., dispersing the hot gases over the underside of the plate 190. Accordingly, combustion in only a few zones may heat the entire length of the cooking surface overlying the fuel tray 310.

Optionally, the gas collection channels 260 may be separated from the inlet 232 to the outlet conduit 230 by a baffle 352, as exemplified in FIG. 7, to encourage hot gases to disperse across the ceiling of the combustion zone 110 before exiting the combustion zone 110. The baffle 352 may extend down to be below at least the upper part of the lowest end of the air collection channels 260, as exemplified.

The fuel zones 350a, 350b, 350c, 350d may be arranged sequentially further from an ignition region 354, as exemplified in FIG. 7. It will be appreciated that the forwardmost fuel zone 350a in the embodiment of FIG. 7 may be the ignition zone 354. Combustion may be ignited in the ignition region 354. It will be understood that in the cooking appliance 100 may include more than one ignition region, such as two ignition regions and/or one ignition region for each fuel tray 310.

Optionally the user may ignite the chosen fuel zone or zones using a built in igniter (e.g., a resistively heated element). Also or alternatively, the user may use an external device, such as by lighting the fuel before sliding the fuel tray 310 into the combustion zone 110 or by lighting the fuel by extending an external device through an opening in the combustion housing 162. For example, the user may extend a lighter or match through the lateral access opening 314 and/or air inlet 152 or the user may lift the body that forms the cooking surface 192 (e.g., the plate 190) to access the combustion zone 110 with a lighter or match. In some examples, the user may begin combustion by lighting the fuel (e.g., a fuel block that is placed in the ignition region 354) while the tray 310 is at least partially removed from the combustion zone 110, and then sliding the tray 310 all the way into the chamber 164.

Inlet Draft Control

The following is a description of a variable inlet air flow, which may be used by itself or in combination with one or more of the combustion zone isolated from the cooking zone, the combustion zone separated from the cooking zone by an impermeable plate, the fluid guide channels, grease carried out of the cooking zone, slidably loaded fuel, fuel zones, rapidly warmed outlet conduit, separate combustion or cooking zones, modular construction, flavor additive, electricity generation, or heat transfer damping, which are set out herein.

In accordance with this aspect, air flow through the cooking appliance 100 may be controlled by changing the cross-sectional flow area (in a direction transverse to the direction of air flow) of at least one portion of the air flow path 150. The cooking appliance 100 may include an adjustment mechanism upstream and/or downstream of the combustion zone 110 to change the cross-sectional area of the air flow path 150 at a point upstream and/or downstream of the combustion zone 110. For example, the cross-sectional flow area of the combustion zone air inlet 152 may be variable. The cooking appliance 100 may include an inlet adjustment mechanism to control the cross-sectional area of, e.g., the combustion zone air inlet 152. The adjustment mechanism may be manual or automatic. An automatic adjustment mechanism may open and/or close the cross-sectional area of the air flow path 150 as a temperature in the combustion zone 110 and/or the cooking zone 120 varies. For example, the inlet adjustment mechanism may include a controller that receives a sensed temperature reading from the combustion zone 110 and/or the cooking zone 120 and controls the cross-sectional area in response to the temperature reading. Optionally, the inlet adjustment mechanism responds directly to temperature, such as including a bimetallic member that changes shape in response to temperature changes. This aspect may be used by itself or in combination with one or more other aspects of this disclosure.

In accordance with this aspect, the air flow path 150 has a variable sized cross-sectional flow area (e.g., at the combustion zone air inlet 152). In other words, the air flow path 150 may be closed, opened, or partially-opened, e.g., to control air flow. As exemplified in FIGS. 6 and 7, an adjustment mechanism 360 may control the cross-sectional area of a portion of the air flow path 150. The exemplified adjustment mechanism 360 is arranged to vary the cross sectional flow area of the inlet 152 to control the flow of air into the combustion zone 110.

As exemplified, the inlet adjustment mechanism 360 may be, e.g., a blocking member that can be moved to cover or partially cover the air inlet 152. The exemplary air inlet 152 is one or more apertures in the door 180. The exemplary adjustment mechanism 360 of FIGS. 6 and 7 is part of the door 180, and includes a manually rotatable blocking member 362. As exemplified the blocking member 362 is a rear wall of door 180 which, in a closed position, abuts the front of the combustion zone 100. The rotatable blocking member 362 may be rotated using, e.g., a handle 364 (see, e.g., FIG. 1) on the door 180. The rotatable blocking member 362 is mounted to the door 180 such that the rotatable blocking member 362 is continuously adjustable between an open position removed from the inlet apertures (FIG. 6) and a closed position covering all of the inlet apertures (FIG. 7). Rotating the rotatable blocking member 362 brings a surface of the blocking member 362 against a face of the door 180 through which the inlet apparatus extend.

It will be appreciated that the blocking member 362 may alternately translate laterally or in any other direction.

Alternately or in addition the blocking member 362 may be member or members that adjust the size of inlet 152 (e.g., one or more louvers or a damper).

It will be understood that the adjustment mechanism 360 may also or alternatively include an automatic adjustment mechanism. An automatic adjustment mechanism 360 may be a powered adjustment mechanism, e.g., include a controller that receives a sensed temperature (e.g., from a thermometer such as the thermometer 224) and controls the position or configuration of a blocking member 362 (e.g., via a motor or solenoid coupled to the blocking member 362 to move the blocking member 362) in response to the sensed temperature.

Also or alternatively, an automatic adjustment mechanism 360 may respond directly to temperature to vary the cross-sectional flow area of the air flow path 150 (e.g., the combustion zone air inlet 152) as a temperature in and/or adjacent the combustion zone 110 varies. For example, the adjustment mechanism 360 may include a bimetal member 366 that moves in response to changes in temperature, as exemplified in FIGS. 19 and 20. Such an adjustment mechanism 360 may move the blocking member 362 or itself be a moveable blocking member 362.

Figure 19:
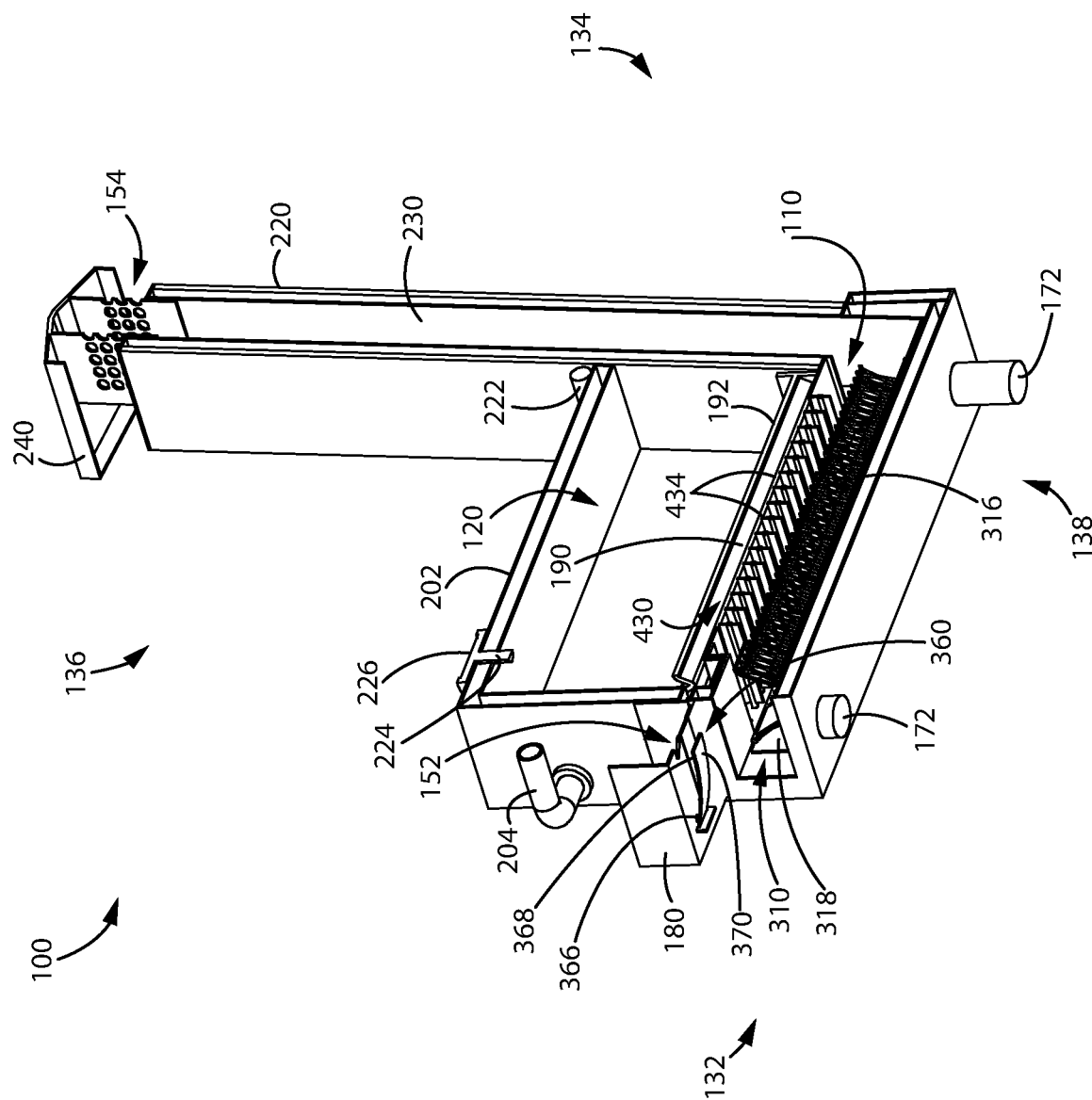
FIG. 19 is a cross sectional view (along a front to rear axis) of a seventh cooking appliance; and, FIG. 20 is a second cross section view of the cooking appliance of FIG. 19.
Figure 20:
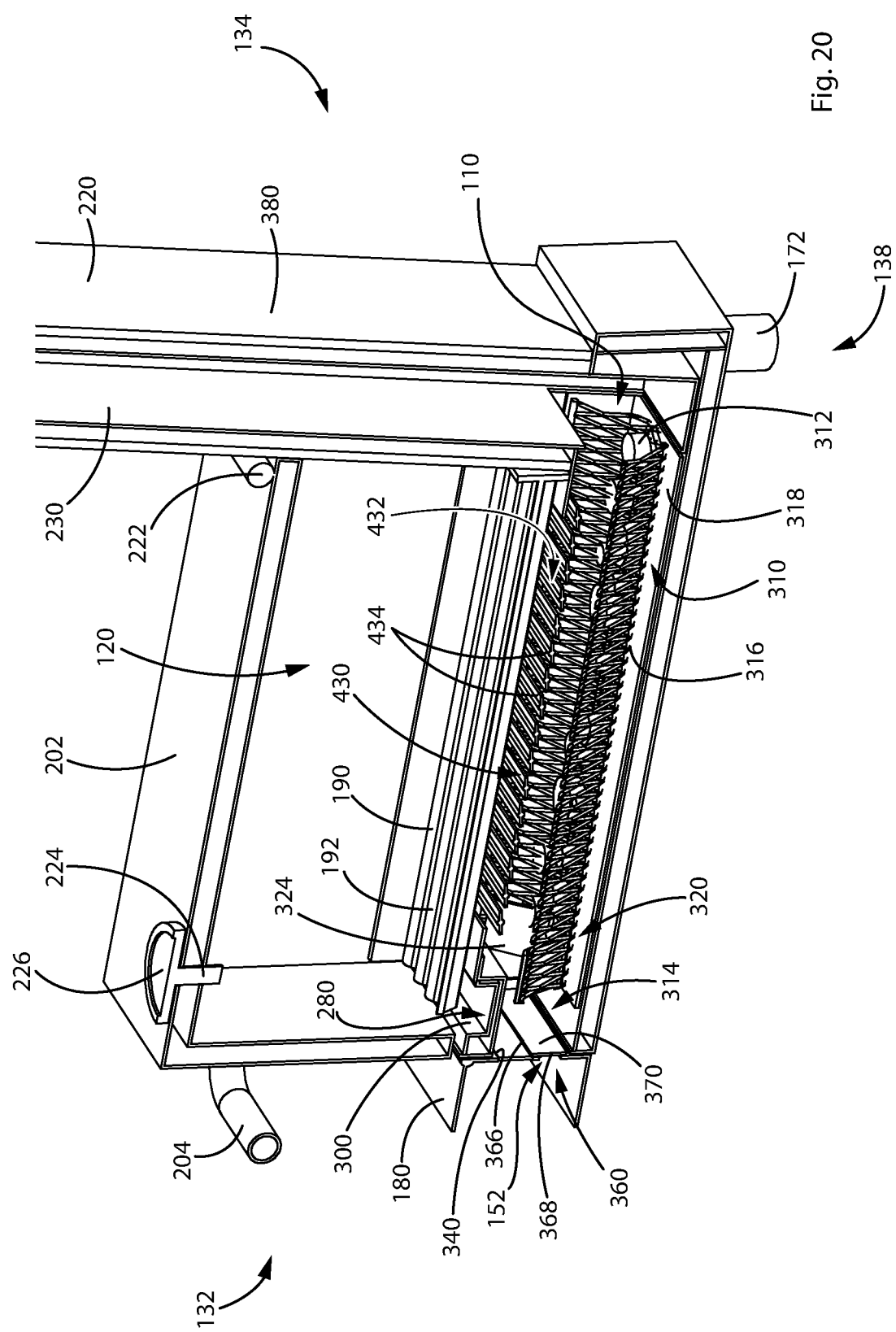

As exemplified in FIGS. 19 and 20, the bimetal member 366 may be a sheet with a first layer of a first metal as a first surface 368 of the sheet and a second layer of a second metal as the opposite surface 370 of the sheet, such that the sheet curls as the first and second layers expand or contract at different rates. The bimetal member 366 may be positioned such that the bimetal member 366 moves to increasingly cover the combustion zone air inlet 152 as the bimetal member 366 is heated, and the metals and positioning may be selected to control the degree to which the combustion zone air inlet 152 is closed as the temperature increases.

The position of an adjustment mechanism 360 that responds directly to temperature may be set by a user. In other words, the adjustment mechanism 360 may be biased by a user to increase or decrease the degree to which the mechanism 360 is able to block air flow when heated. The responsive adjustment mechanism 360 may include a biasing knob or handle that user may use to position the adjustment mechanism 360 based on a desired maximum blocking of the inlet 152. For example, a bimetal member 366 may deform a consistent amount when heated, but may include a biasing knob that a user can use to position the bimetal member 366 to control the degree to which the deformation blocks the combustion zone air inlet 152. In other words, the bimetal member 366 that deforms as it is heated to close the air inlet 152 may be moved away from the combustion zone air inlet 152 if a hotter temperature is desired, such that even a great deformation will not close the air inlet 152 as much as if the bimetal member 366 was positioned closer to the air inlet 152.

Rapidly Warmed Outlet Conduit

The following is a description of an outlet conduit 230 that may be rapidly warmed, which may be used by itself or in combination with one or more of the combustion zone isolated from the cooking zone, the combustion zone separated from the cooking zone by an impermeable plate, the fluid guide channels, grease carried out of the cooking zone, slidably loaded fuel, fuel zones, inlet draft control, separate combustion or cooking zones, modular construction, flavor additive, electricity generation, or heat transfer damping, which are set out herein.

In accordance with this aspect, the walls of the air flow path 150 through the outlet conduit 230 may be warmed rapidly to reduce the occurrence of cooler gases in the outlet conduit 230 that obstruct the movement of warmer gases through the outlet conduit 230 and therefore through the combustion zone 110. For example, the outlet conduit 230 may be a thin-walled metal structure such that the outlet conduit 230 may be rapidly heated, e.g., by warm gases coming from the combustion zone 110. Due to the outlet conduit 230 being thin walled, the outlet conduit has a low thermal mass and may therefore be rapidly heat by the combustion gasses passing therethrough even if a small mass of fuel (e.g., the fuel in the first fuel zone 350a) is ignited. As the outlet conduit 230 becomes hotter, the density of the air in the outlet conduit 230 is reduced thereby creating an increased flow of air through the combustion zone 110. This increased flow of air will increase the rate of combustion of fuel in the first fuel zone 350a, which will produce more combustion gasses that will ignite subsequent fuel zones as the combustion gasses are drawn through the combustion zone 110 to the outlet conduit 230. Accordingly, igniting only, g., 10, 15, 20 or 25% of the fuel may result in all of the fuel being sequentially ignited.

Optionally, the outlet conduit 230 extends vertically, e.g., through a chimney 220, and the chimney 220 may also be a support structure 380 for the thin-walled outlet conduit 230. The chimney 220 and/or the support structure 380 may also or alternatively insulate the outlet conduit 230. This aspect may be used by itself or in combination with one or more other aspects of this disclosure.

As exemplified in FIG. 6, the outlet conduit 230 extends between the combustion zone 110 and the combustion zone air outlet 154. As described previously, the outlet conduit 230 may be part of a chimney 220. The exemplified combustion zone air flow path 150 (FIG. 2) comprises the chimney 220 positioned downstream from the combustion zone 110. The chimney 220 includes the outlet conduit 230 and a support structure 380 to support the outlet conduit 230. The exemplified outlet conduit 230 includes an inner air flow duct 382, and the exemplified support structure 380 is an outer duct spaced from the inner duct. The combustion zone air outlet 154 is provided at an upper end of the inner duct of the chimney 220. Optionally, the inner duct 382 is formed of a readily-warmed (low thermal mass) material, such as a thermally conductive material to encourage warming of the inner duct 382. For example, the inner duct 382 may be formed of a metal such as copper or steel.

Optionally, the outlet conduit 230 is insulated. For example, an insulating material may be arranged around the outlet conduit 230, e.g., to prevent the outlet conduit 230 from being cooled by the movement of air around the outlet conduit 230. As exemplified, the chimney includes a gap 384 (i.e., filled with a gas such as air) between the outlet conduit 230 and the support structure 380. The gap 384 is isolated from the combustion zone air flow path and from the cooking zone. The gap 384 may be isolated from any exterior source of air to, e.g., prevent the movement of air across the outside of the inner duct 382. The gap 384 serves as an insulation for the inner duct 382 to inhibit the transfer of heat away from the inner duct 382. It will be understood that other insulation could also or alternatively be used, such as fiberglass insulation.

The outlet conduit 230 (e.g., the inner duct 382) may have a thickness (i.e., in a direction transverse to the flow of air through the air flow path 150) that is less than the thickness of the outer duct 380. The outlet conduit 230 (e.g., the inner duct 382) may have a thickness of between 0.001 inches and 0.1 inches, between 0.001 inches and 0.075 inches, between 0.001 inches and 0.05 inches, between 0.01 inches and 0.03 inches, or between 0.015 inches and 0.02 inches. The outer duct 380 may have a thickness of between 0.02 inches and 0.5 inches, between 0.04 inches and 0.25 inches, or between 0.06 inches and 0.125 inches.

The outlet conduit 230 may carry an increased air flow as it warms up. The increase may be scaled up as the temperature increases. For example, the chimney 220 may carry 2 cfm at 20° C., 3 cfm at 65° C., 5 cfm at 100° C., and 8 cfm at 125° C.

Separate Combustion or Heating Zones

The following is a description of a separate combustion zones and/or separate cooking zones, which may be used by itself or in combination with one or more of the combustion zone isolated from the cooking zone, the combustion zone separated from the cooking zone by an impermeable plate, the fluid guide channels, grease carried out of the cooking zone, slidably loaded fuel, fuel zones, inlet draft control, rapidly warmed outlet conduit, modular construction, flavor additive, electricity generation, or heat transfer damping, which are set out herein.

In accordance with this aspect, the cooking appliance 100 includes a plurally of combustion zones 110 and/or a plurality of cooking zones 120. If the cooking appliance has a plurality of combustion zones 110, then the cooking appliance 100 may include a plurality of combustion chambers 164, each of which may have one or more (e.g., a plurality) of fuel trays 310. If the cooking appliance has a plurality of cooking zones 120, then the cooking appliance 100 may include one or more lids 202. In any such embodiment, it will be appreciated that the cooking appliance 100 may have one or more of the following: one or more plates 190, one or more lids 202, one or more drip trays 300, and one or more chimneys 220. For example, the cooking appliance 100 may be formed of a plurality of combustion chambers 110 with a fuel tray 310 and an outlet conduit 230 for each combustion chamber 110, but only a single plate 190, a single drip tray 300, and a single lid 202. Also or alternatively, the cooking appliance 100 may include a plurality of cooking zones 120, such as two separate cooking zones 120 each with its own cooking zone lid 202 but over a shared combustion zone 110. Separate combustion and/or cooking zones may allow for a more controlled combustion, differently heated regions within the cooking zone 120, smaller components that may each fit in a dishwasher and/or separated food combustion. This aspect may be used by itself or in combination with one or more other aspects of this disclosure.

Figure 11:
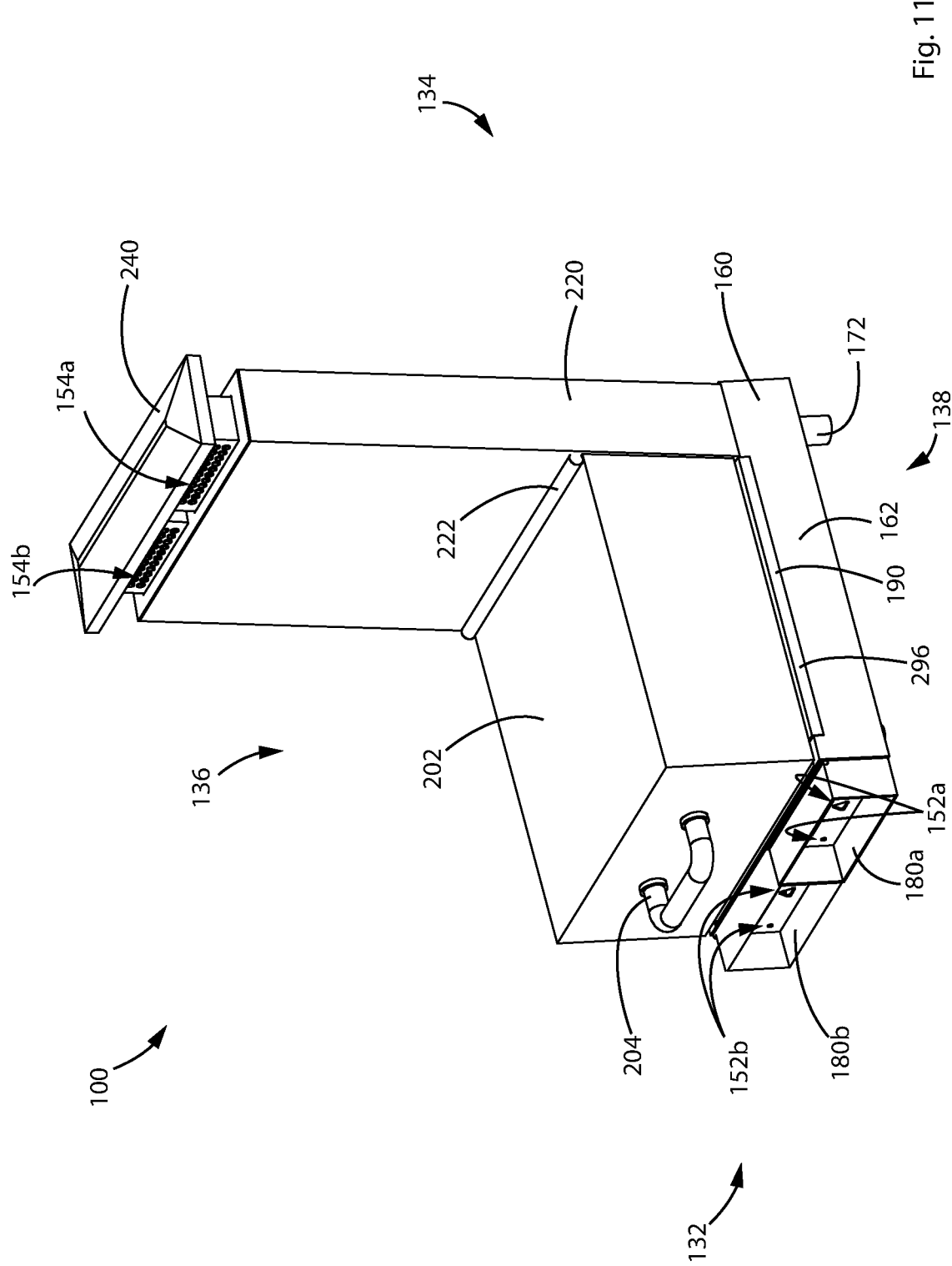
FIG. 11 is a front top perspective view of a third cooking appliance.
Figure 12:
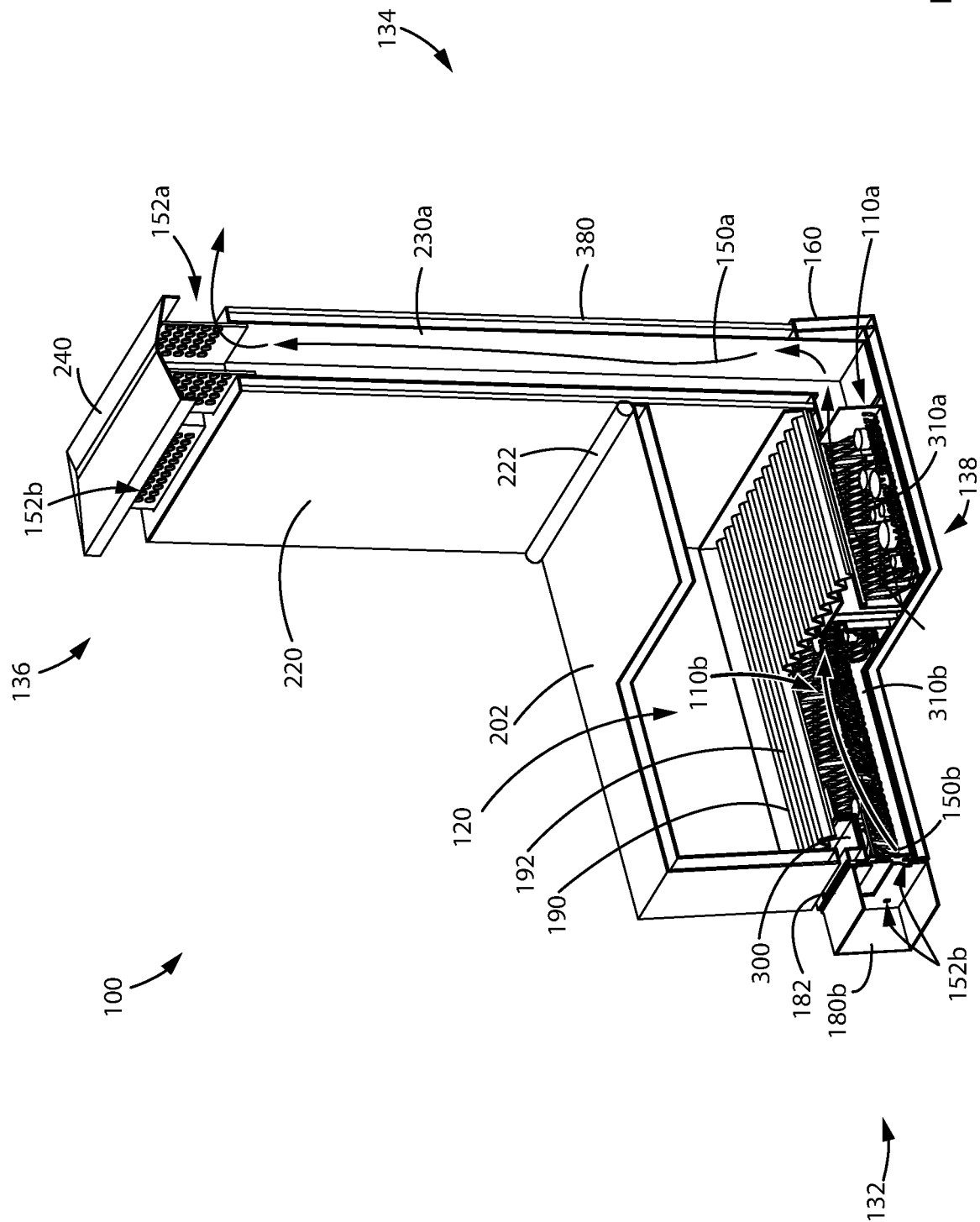
FIG. 12 is a cross sectional view of the cooking appliance of FIG. 11.

As exemplified in FIGS. 11 and 12, the cooking appliance 100 may have a plurality of combustion zones 110. The combustion zones 110 may be separated from one another. In other words, the combustion zones 110 may be divided (e.g., by a wall) such that flames cannot pass from one zone 110 to another zone 110. As exemplified, the cooking appliance 100 may include a first combustion zone 110a and a second combustion zone 110b. Separate combustion zones 110a, 110b may allow for separate heat control. It will be appreciated that, as exemplified, the combustion zones are fluidically isolated from each other. The combustion zones may be thermally connected (e.g., the may share one or more longitudinally extending walls) or they may be thermally isolated from each other by an insulating member. In any such embodiment, the cooking appliance 100 may also include a single main body 160, a single cooking surface 192, a single lid 202, and/or a single outer duct 380. As exemplified, the cooking appliance 100 with separate combustion zones 110*a*, 110*b* may also have separate fuel trays 310, doors 180, and/or outlet conduits 230. As exemplified, the cooking appliance 100 of FIGS. 11 and 12 includes a first fuel tray 310*a* and a second fuel tray 310*b*, a first door 180*a* and a second door 180*b*, and a first outlet conduit 230*a* and a second outlet conduit (not shown). Due to this construction, the combustion zones 110*a*, 110*b* each have a separate (fluidically isolated) air flow path 150, with the air flow path 150*a* of the first combustion zone 110*a* extending from a first air inlet 152*a* to a first air outlet 154*a* and the air flow path 150*b* of the second combustion zone 110*b* extending from a second air inlet 152*a* to a second air outlet 154*b*.

The exemplified first and second combustion zones 110*a*, 110*b* are of the same size. Optionally, the cooking appliance 100 may include a first combustion zone that is a different size than a second combustion zone. For example, the cooking appliance may include a first combustion zone that has a first width and a first depth and a second combustion zone that has a second width and a second depth, and one or both of the first and second widths and the first and second depths may be different from one another.

It will be appreciated that any such combustion zone may have 1 or more fuel trays 310.

Figure 13:
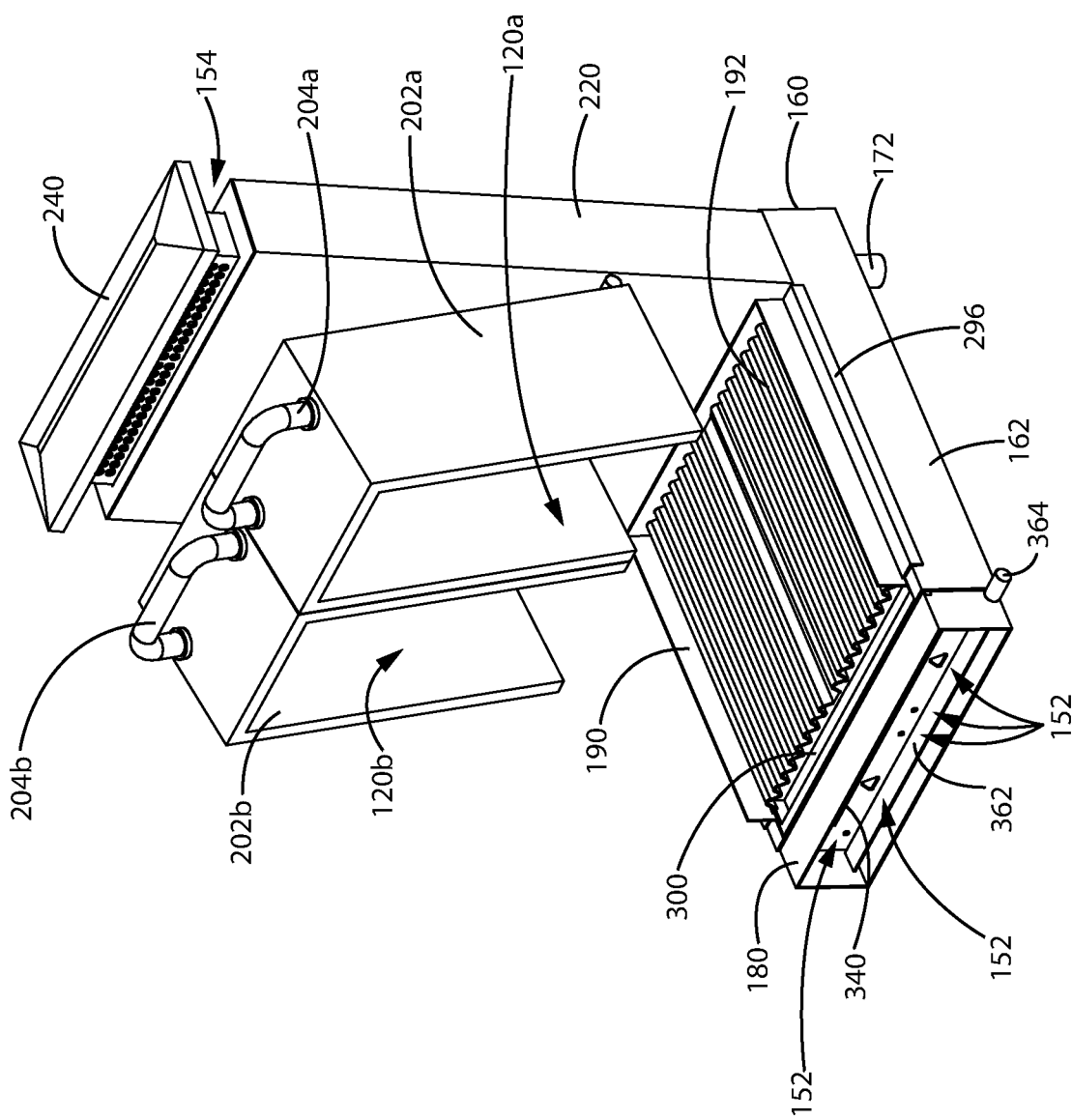
FIG. 13 is a front top perspective view of a fourth cooking appliance.

As exemplified in FIG. 13, the cooking appliance 100 may include a plurality of cooking zones 120. The cooking zones 120 may be separated from one another. In other words, the cooking zones 120 may be divided (e.g., by a wall) such that gases cannot pass from one zone 120 to another zone 120. For example, the cooking appliance 100 may include a plurality of lids 202 over a common plate 190 or each over its own plate 190. As exemplified in FIG. 13, the cooking appliance 100 may include a first lid 202*a* over one side of the plate 190 to enclose a first cooking zone 120*a* when lowered against the plate 190, and another lid 202*b* over the other side of the plate 190 to enclose a second cooking zone 120*b* when lowered against the plate 190. Separate cooking zones may allow a user to use separate cooking techniques, such as adding smoke to one cooking zone and not the other. The cooking appliance 100 may include a plurality of cooking zones 120 in a single cooking appliance, such as with a single main body 160, combustion housing 162, and/or chimney 220. A plurality of cooking zones may be used in common with a plurality of combustion zones 110, or with a single combustion zone 110.

Modular Construction

The following is a description of a modular construction, which may be used by itself or in combination with one or more of the combustion zone isolated from the cooking zone, the combustion zone separated from the cooking zone by an impermeable plate, the fluid guide channels, grease carried out of the cooking zone, slidably loaded fuel, fuel zones, inlet draft control, rapidly warmed outlet conduit, separate combustion or cooking zones, flavor additive, electricity generation, or heat transfer damping, which are set out herein.

In accordance with this aspect, at least one component of the cooking appliance 100 is formed of a plurality of modules. For example, a large cooking surface 192 may be formed of a plurality of plates 190. A modular construction may allow for parts sized for easy cleaning (e.g., to fit in a dishwasher). This aspect may be used by itself or in combination with one or more other aspects of this disclosure.

Figure 14:
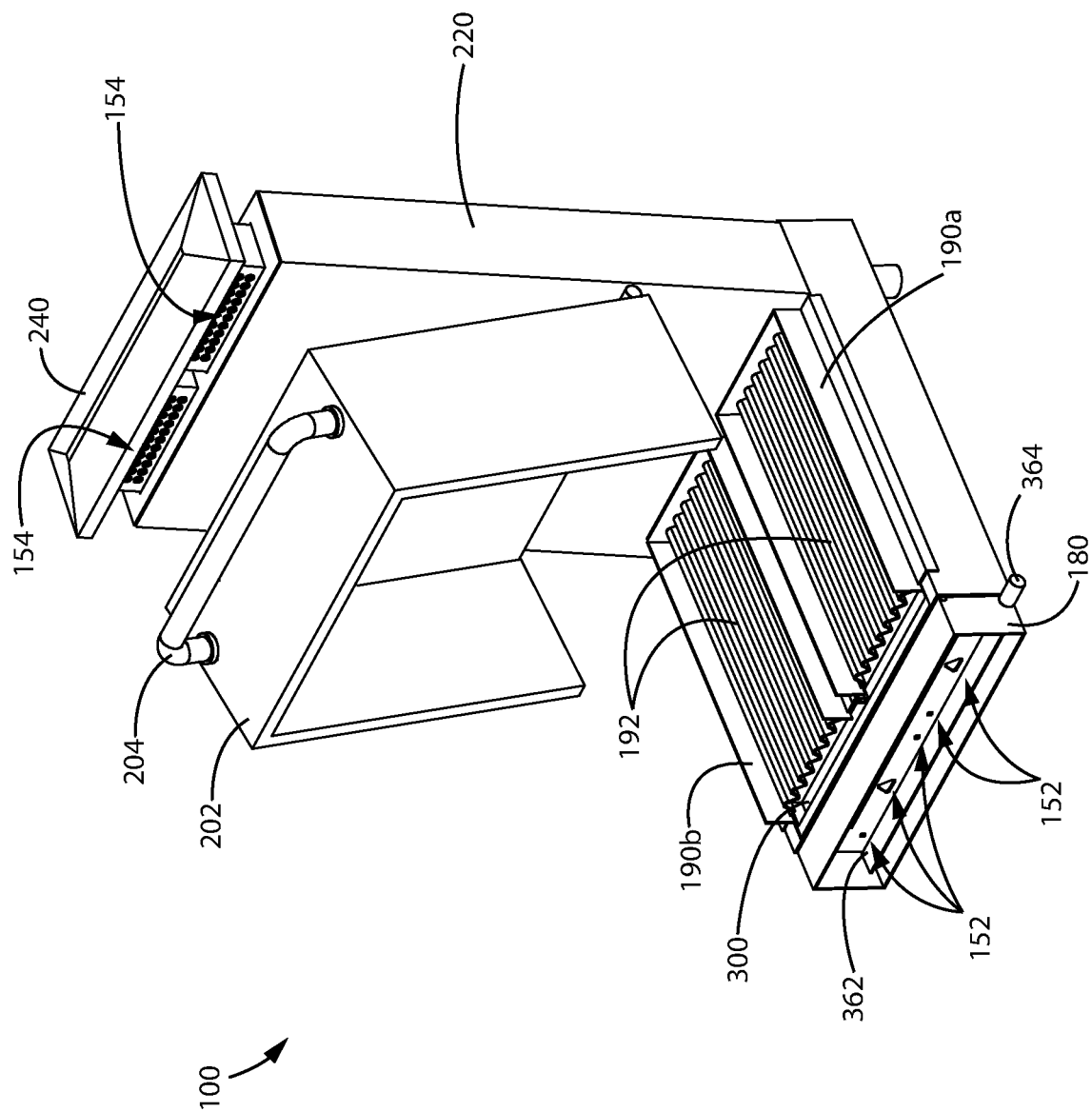
FIG. 14 is a front top perspective view of a fifth cooking appliance.

As exemplified in FIG. 14, the cooking appliance 100 may include a plurality of modules of at least one component. In the exemplary embodiment the cooking appliance 100 includes a plurality of plates 190. That is, the cooking appliance 100 includes a first plate 190*a* and a second plate 190*b* together forming the cooking surface 192. It will be understood that the cooking appliance may also or alternatively have a plurality of modules of at least one other component, such as a plurality of drip trays to gather the liquid from one or more plates 190, a plurality of lids 202 or liners for a lid or lids (e.g., a plurality of lids 202 even where the lids 202 do not fluidically separate a plurality of cooking zones 120), and/or a plurality of fuel trays 310 (e.g., a plurality of fuel trays 310 to be received concurrently in a single combustion zone 110).

Modular construction may allow the components that are to be cleaned to be sized small enough to fit in a dishwasher. For example, each component may be sized to be at most 20 inches to a side (i.e., a length, a width, and/or a height), 15 inches to a side, 12 inches to a side, or 8 inches to a side. Commonly-cleaned components include the plate, the lid or lid liner if the lid has a liner, fuel tray, and drip tray. For example, the plate may be at most 12 inches by 12 inches or 8 inches by 12 inches to allow for easy loading in a standard residential dishwasher. Optionally, the cooking zone, cooking chamber, combustion zone, combustion chamber, and/or plate are 18 inches in length from front to back and 9 or 10 inches in width between lateral sides.

Flavor Additive

The following is a description of a cooking appliance 100 used with a flavor agent, which may be used by itself or in combination with one or more of the combustion zone isolated from the cooking zone, the combustion zone separated from the cooking zone by an impermeable plate, the fluid guide channels, grease carried out of the cooking zone, slidably loaded fuel, fuel zones, inlet draft control, rapidly warmed outlet conduit, separate combustion or cooking zones, modular construction, electricity generation, or heat transfer damping, which are set out herein.

In accordance with this aspect, a flavor additive may be added to food in the cooking zone 120. The flavor additive may be, e.g., smoke. That is, smoke may be added to the cooking zone 120. Optionally, the flavor additive may be produced by combustion in the cooking zone 120. A cooking zone air flow path may extend through the cooking zone 120 from a cooking zone air intake to a cooking zone air outlet, to feed a combustion in the cooking zone 120. The cooking zone air flow path may be fluidically isolated from the combustion zone air flow path 150. Additionally or alternatively, the cooking zone 120 may include a container in the cooking zone 120, e.g., to hold a material such as wood chips that is to be combusted to generate the flavor additive e.g., smoke). This aspect may be used by itself or in combination with one or more other aspects of this disclosure.

Figure 15:
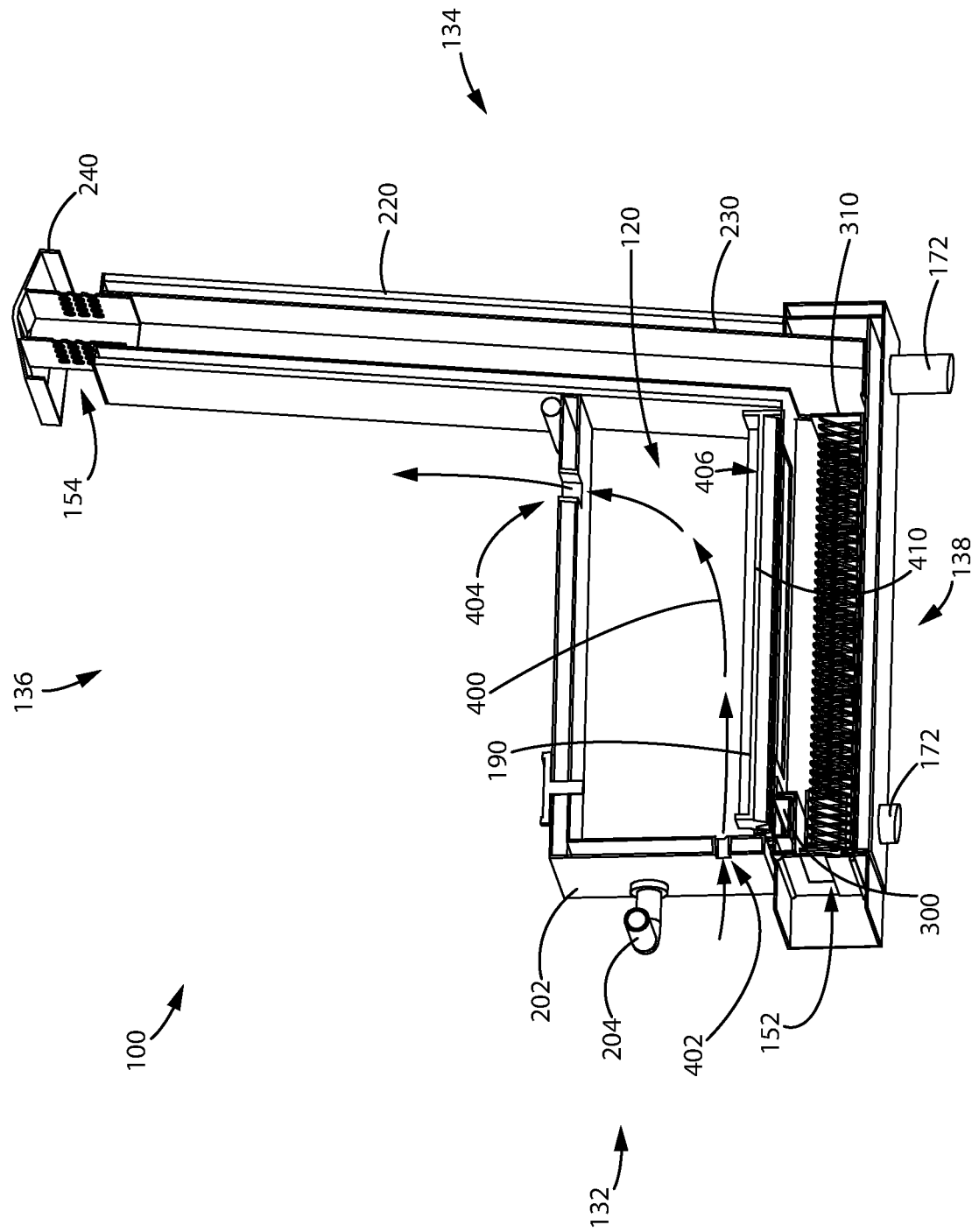
FIG. 15 is a cross sectional view (along a front to rear axis) of a sixth cooking appliance.

It will be understood that the flavor additive may be added to the cooking zone 120 in any suitable way, such as by piping in smoke form a separate smoker. However, the flavor additive (e.g., smoke) may be generated in the cooking zone 120, and may be generated by heating of wood chips in the cooking zone 120 (e.g., by combustion). As exemplified in FIG. 15, the cooking appliance 100 may include a cooking zone air flow path 400 extending between an air inlet 402 and an air outlet 404. The cooking zone air flow path 400 extends through the cooking zone 120 to provide air to assist in the combustion of a material in the cooking zone 120. The material may be a combustible material such as wood chips, wood pellets, or switchgrass pellets. Any material used to provide smoke may be used. The air inlet 402 and/or air outlet 404 may be small (i.e., have a small total cross-sectional area) to keep the volume of air flow low. In other words, the air inlet 402 and/or air outlet 404 may have a smaller total cross sectional area than a total cross sectional area of the combustion zone air inlet 152 and/or the combustion zone air outlet 154. For example, the air inlet 402 and/or air outlet 404 may have a total cross sectional area that is less than 75%, less than 50% or less than 25% of a total cross sectional area of the combustion zone air inlet 152 and/or the combustion zone air outlet 154.

It will be appreciated that, to produce smoke, the flavour additive need not burn but may only be heated to a temperature at which it will produce smoke (e.g., it may be heated to smolder) and in this section combustion is used to refer to any temperature at which the flavour additive the flavour component (e.g., smoke).

Figure 16:
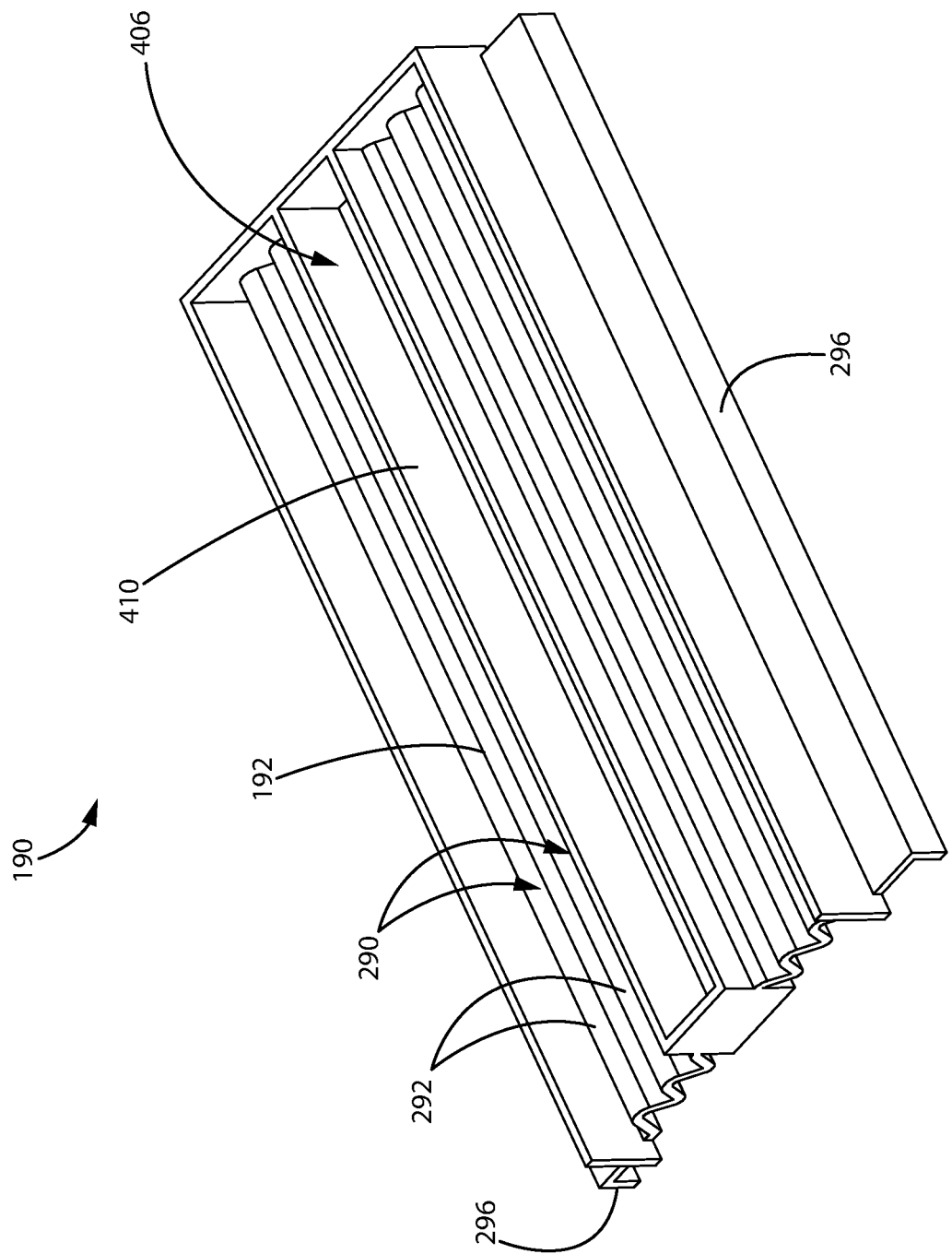
FIG. 16 is a front top perspective view of a second impermeable plate.
Figure 17:
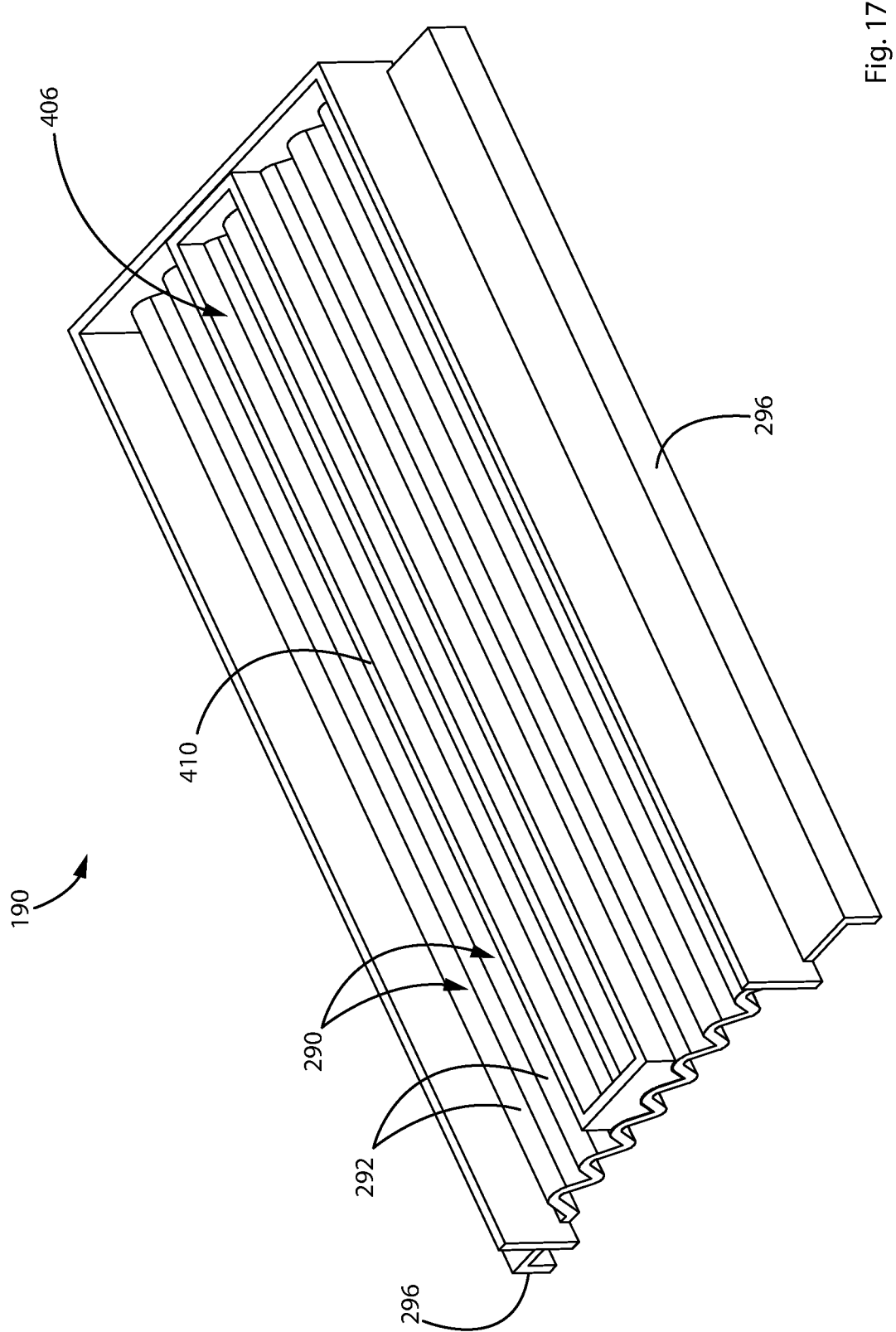
FIG. 17 is a front top perspective view of a third impermeable plate.
Figure 18:
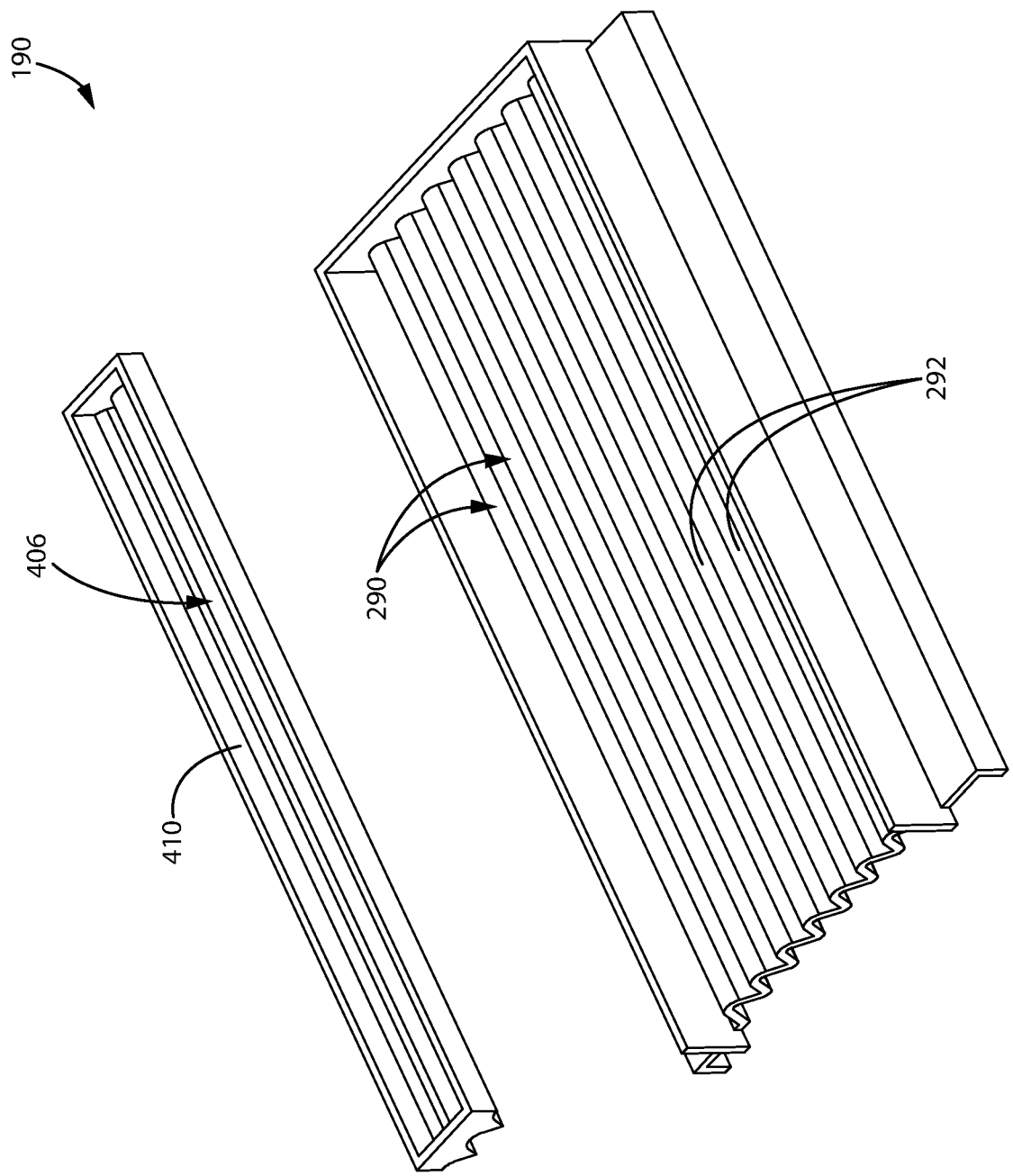
FIG. 18 is an exploded view of the impermeable plate of FIG. 17.

The combustible material may be arranged in a flavor precursor region in the cooking zone 120 and combusted during a cooking operation to disperse the flavor additive (e.g., smoke) to the food in the cooking zone 120. As exemplified in FIG. 16, the flavor precursor region 406 containing the combustible material may be a region on or adjacent the plate 190 and/or cooking surface 190. The flavor precursor region 406 may include a lower end that is below the peaks 292 of the corrugations 290. In other words, the combustible material may be nestled in-between the corrugations 290. Optionally, as exemplified in FIGS. 16, 17, and 18, the cooking appliance 100 includes a container 410 to receive the flavor agent. The flavor agent container 410 may be built into the cooking surface 192 as exemplified in FIG. 17. Also or alternatively, the cooking appliance 100 may include a detachable container 410, such as a container 410 that rests on the cooking surface 192 as exemplified in FIGS. 17 and 18. The container 410 may include a lower end that is below the peaks 292, as exemplified. Where the cooking surface 192 is corrugated, the base of the container 410 may be corrugated to match the corrugations of the cooking surface 192. The combustible material may be held in the container 410 as it is combusted in the cooking zone 120 to generate the flavor additive.

Optionally, the cooking appliance 100 also or alternatively includes a pot, a griddle plate, a frying pan, or another container arranged to rest on the cooking surface 192 with, optionally, portions of the base of the container extending below the peaks 292. For example, the cooking appliance 100 may include a pot, a griddle plate, a frying pan, or another container with a base having channels formed in a lower surface corresponding to the peaks 292 between drainage channels 170 of the cooking surface 192, such as a pot with a corrugated base similar to the base of container 410. That is, the container may be arranged on the cooking appliance securely and/or with excellent heat transfer from the cooking surface to the container due to the increased surface area in contact with the cooking surface 192 compared to a container that rests on the peaks 292 of the cooking surface 192.

Electricity Generation

The following is a description of the use of the cooking appliance 100 to generate electricity, which may be used by itself or in combination with one or more of the combustion zone isolated from the cooking zone, the combustion zone separated from the cooking zone by an impermeable plate, the fluid guide channels, grease carried out of the cooking zone, slidably loaded fuel, fuel zones, inlet draft control, rapidly warmed outlet conduit, separate combustion or cooking zones, modular construction, flavor additive, or heat transfer damping, which are set out herein.

In accordance with this aspect, the cooking appliance 100 may be used to generate electricity. The electricity may be used to power one or more onboard powered components, may be stored, and/or may be provided for use by external devices. For example, the cooking appliance 100 may include a thermoelectric generator such as a thermopile. This aspect may be used by itself or in combination with one or more other aspects of this disclosure.

As exemplified in FIG. 1, the cooking appliance 100 may include a thermoelectric generator 420. The exemplified thermoelectric generator 420 is a thermopile. The thermoelectric generator 420 may be arranged in any suitable position in thermal communication with the combustion zone. For example, the thermoelectric generator 420 may be arranged on a lateral wall of the combustion housing 162 (e.g., against the outside of the wall if the lateral wall is not an insulated wall, or extending through one or more outer layers of the wall). If, e.g., the lateral wall of the combustion housing 162 is insulated, the thermoelectric generator 420 also or alternatively may be arranged in another location, such as in the cooking zone 120, e.g., on the impermeable plate 190. The exemplified thermoelectric generator 420 extends through the outer layers of the lateral wall of housing 162 to the inner surface of the panel forming the outer lateral edge of the combustion zone 110, however it will be understood that the thermoelectric generator 420 may alternatively be an internal component (i.e., within the body 160, such as within the combustion chamber and/or within the outlet conduit 230).

The thermopile may generate electricity for the adjustment mechanism 360, for lights (e.g., light emitting diodes on an inside of the lid 202), a rotisserie, a fan (e.g., to drive air flow in the outlet conduit), or another on-board component. For example, the adjustment mechanism 360 for controlling the cross-sectional area of the air flow path may be a powered mechanism. The adjustment mechanism 360 may include a motor and a controller, as described above. Power for the adjustment mechanism 360 may optionally be generated by the thermoelectric generator 420.

Additionally or alternatively, energy from the thermoelectric generator 420 may be stored and/or provided to external components. The cooking appliance 100 may include an on-board energy storage device such as a battery or capacitor to store the energy, which may store power for use during the startup operation of the cooking appliance 100. The cooking appliance may include an energy transfer port such as a charging port for use by an external component to receive electricity from the cooking appliance, e.g., a universal serial bus (USB) port to act as a USB charger (e.g., for a smartphone). Optionally, an energy storage device and/or energy transfer port may be insulated from the combustion zone 110 and/or on an external surface of the cooking appliance 100.

Heat Transfer Damping

The following is a description of damping heat transfer from the combustion zone 110 to the cooking zone 120, which may be used by itself or in combination with one or more of the combustion zone isolated from the cooking zone, the combustion zone separated from the cooking zone by an impermeable plate, the fluid guide channels, grease carried out of the cooking zone, slidably loaded fuel, fuel zones, inlet draft control, rapidly warmed outlet conduit, separate combustion or cooking zones, modular construction, flavor additive, or electricity generation, which are set out herein.

In accordance with this aspect, a user is able to control the transfer of heat between the combustion zone 110 and the cooking zone 120. The user may control the transfer of heat between the combustion zone 110 and the cooking zone 120 by controlling the movement of hot gases from the combustion zone 110 towards and/or in thermal communication with the cooking zone 120. The cooking appliance 100 may include an adjustable damper that may be arranged to control the flow of hot gases from the combustion zone towards the cooking zone, such as by controlling the flow of hot gases towards the impermeable plate 190 separating the cooking zone and the combustion zone. This aspect may be used by itself or in combination with one or more other aspects of this disclosure.

As exemplified in FIGS. 19 and 20, the cooking appliance 100 includes an adjustable damper 430 between the combustion zone 110 and the cooking zone 120. The adjustable damper 430 is arranged at an upper end of the combustion zone 110 to control the movement of hot gases and/or infrared radiation towards a lower surface of the cooking zone 120. The adjustable damper 430 may be adjustable (e.g., continuously adjustable) between being open to the passage of hot gases and/or infrared radiation to the lower surface of the cooking zone 120 and being closed to the passage of hot gases and/or infrared radiation to the lower surface of the cooking zone 120. Closing the adjustable damper 430 may form an insulating region between the cooking zone 120 and the fuel tray 310 which may insulate against heat transfer. For example, the insulating region may be an air gap 432 (FIG. 20) between the adjustable damper and the plate 190.

Optionally, the adjustable damper 430 may be, as exemplified, a set of louvers 434 between the fuel tray 310 and the ceiling of the combustion zone 110 (i.e., the bottom of the plate 190). The louvers 434 may be closed to or partially closed to redirect hot gases away from the ceiling of the combustion zone 110. For example, an adjustment knob may be provided on an exterior of the cooking appliance 100 for use by a user in manually adjusting the position of the louvers 434. It will be appreciated that other suitable adjustable dampers may also or alternatively be used.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Clause Set A

1. A cooking appliance comprising:
    (a) a cooking zone comprising a cooking surface having a plurality of corrugations and a cooking zone positioned above the cooking surface, wherein the corrugations extend downwardly, optionally at an angle of up to 15° from a horizontal plane; and,
    (b) a combustion zone positioned underlying the cooking zone, the combustion zone having a combustion zone air flow path from a combustion zone air inlet to a combustion zone air outlet,
whereby combustion products produced in the combustion zone are directed away from the cooking zone by the combustion zone air flow path.

2. The cooking appliance of clause 1 wherein a lower side of the cooking surface is air impermeable.

3. The cooking appliance of clause 1 wherein the combustion zone air flow path comprises a chimney positioned downstream from the combustion zone, the combustion zone air outlet is provided at an upper end of the chimney and the combustion zone air outlet is located at an elevation above the cooking zone.

4. The cooking appliance of clause 1 wherein the combustion zone air flow path comprises a chimney positioned downstream from the combustion zone, the chimney comprises an inner air flow duct and an outer duct spaced from the inner duct, the combustion zone air outlet is provided at an upper end of the inner duct of the chimney.

5. The cooking appliance of clause 4 wherein a gap is provided between the inner duct and the outer duct, and the gap is isolated from the combustion zone air flow path and from the cooking zone.

6. The cooking appliance of clause 4 wherein the inner duct has a thickness of 0.01-0.03, optionally 0.015-0.02 inches.

7. The cooking appliance of clause 1 wherein the corrugations have a plurality of peaks and a plurality of valleys, the lower surface of the peaks comprises part of an outer wall of the combustion zone whereby the lower surface of the peaks is exposed to combustion products when combustion occurs in the combustion zone.

8. The cooking appliance of clause 7 wherein a body forming the cooking surface is transparent to IR radiation.

9. The cooking appliance of clause 1 wherein a body forming the cooking surface is transparent to IR radiation and an openable lid is IR reflective.

10. The cooking appliance of clause 7 further comprising a drip tray that is external to the cooking zone and the valleys direct liquid produced during cooking to the drip tray.

11. The cooking appliance of clause 7 wherein the valleys direct liquid produced during cooking to a removable drip tray.

12. The cooking appliance of clause 1 wherein the cooking appliance has a front and a rear, an openable lid has a rear end that is moveably mounted with respect to the cooking appliance, and the corrugations extend in a forward/rearward direction.

13. The cooking appliance of clause 7 wherein the peaks have a thickness that is less than a thickness of the valleys.

14. The cooking appliance of clause 1 wherein the corrugations have a plurality of peaks and a plurality of valleys, and the peaks have a thickness that is less than a thickness of the valleys.

15. The cooking appliance of clause 9 wherein the cooking surface is made of copper and/or aluminum.

16. The cooking appliance of clause 1 wherein the cooking surface has a region for receiving a combustible material.

17. The cooking appliance of clause 16 wherein the corrugations have a plurality of peaks and a plurality of valleys, and the region has a lower end which is below the peaks.

18. The cooking appliance of clause 1 further comprising a fuel tray that is slideably receivable in a front end of the combustion zone.

19. The cooking appliance of clause 18 wherein the fuel tray comprises at least first and second discrete fuel zones and the second fuel zone is positioned rearward of the first fuel zone.

20. The cooking appliance of clause 18 wherein a forward end of the fuel tray includes a window.

Clause Set B

1. A cooking appliance comprising:
    (a) a cooking zone comprising a cooking surface having a plurality of corrugations, the corrugations having a plurality of peaks and a plurality of valleys, wherein the corrugations extend downwardly, optionally at an angle of up to 15° from a horizontal plane;
    (b) a combustion zone in thermal communication with the cooking zone; and,
    (c) a drip tray that is external to the cooking zone and the valleys direct liquid produced during cooking to the drip tray.

2. The cooking appliance of clause 1 wherein the drip tray is external to the cooking appliance.

3. The cooking appliance of clause 1 wherein the drip tray is removable from the cooking appliance and provided on an exterior surface of the cooking appliance.

4. The cooking appliance of clause 1 wherein the lower surface of the peaks comprises part of an outer wall of the combustion zone whereby the lower surface of the peaks is exposed to combustion products when combustion occurs in the combustion zone.

5. The cooking appliance of clause 4 wherein a body forming the cooking surface is transparent to IR radiation.

6. The cooking appliance of clause 1 wherein a body forming the cooking surface is transparent to IR radiation and an openable lid is IR reflective.

7. The cooking appliance of clause 1 wherein a lower side of the cooking surface is air impermeable.

8. The cooking appliance of clause 1 wherein the cooking zone is isolated from combustion products.

9. The cooking appliance of clause 8 further comprising a chimney positioned downstream from the combustion zone, a combustion zone air outlet is provided at an upper end of the chimney and the combustion zone air outlet is located at an elevation above the cooking zone.

10. The cooking appliance of clause 8 further comprising a chimney positioned downstream from the combustion zone, the chimney comprises an inner air flow duct and an outer duct spaced from the inner duct, the combustion zone air outlet is provided at an upper end of the inner duct of the chimney.

11. The cooking appliance of clause 10 wherein a gap is provided between the inner duct and the outer duct, and the gap is isolated from the combustion zone air flow path and from the cooking zone.

12. The cooking appliance of clause 10 wherein the inner duct has a thickness of 0.01-0.03, optionally 0.015-0.02 inches.

13. A cooking appliance comprising:
    (a) a cooking zone comprising a cooking surface having a plurality of drainage channels that extend downwardly, optionally at an angle of up to 15° from a horizontal plane;
    (b) a combustion zone in thermal communication with the cooking zone; and
    (c) a drip tray that is external to the cooking appliance and the valleys direct liquid produced during cooking to the drip tray.

14. The cooking appliance of clause 13 wherein the drip tray is removable from the cooking appliance and provided on an exterior surface of the cooking appliance.

15. The cooking appliance of clause 13 wherein the cooking appliance has a front and a rear, an openable lid has a rear end that is moveably mounted with respect to the cooking appliance, and the drainage channels extend in a forward/rearward direction.

16. The cooking appliance of clause 13 wherein the cooking surface further comprises a plurality of peaks, and the peaks have a thickness that is less than a thickness of a lower surface of the drainage channels.

17. The cooking appliance of clause 13 wherein a body forming the cooking surface is transparent to IR radiation.

18. The cooking appliance of clause 13 wherein a body forming the cooking surface is transparent to IR radiation and an openable lid is IR reflective.

19. The cooking appliance of clause 17 wherein the cooking surface is made of copper and/or aluminum.

20. The cooking appliance of clause 13 wherein the cooking surface has a region for receiving a combustible material, the cooking surface further comprises a plurality of peaks, and the region has a lower end which is below the peaks.

Clause Set C

1. A cooking appliance having a front and a rear, the cooking appliance comprising:
    (a) a combustion zone having a combustion zone air flow path extending from a combustion zone air inlet to a combustion zone air outlet;
    (b) a cooking zone positioned overlying the combustion zone, the cooking zone comprising a closed cooking volume having a cooking surface and an openable lid that has a rear end that is moveably mounted with respect to the cooking appliance; and,
    (c) a fuel tray that is slideably receivable in a front end of the combustion zone.

2. The cooking appliance of clause 1 wherein the fuel tray comprises at least first and second discrete fuel zones and the second fuel zone is positioned rearward of the first fuel zone.

3. The cooking appliance of clause 2 wherein a forward end of the fuel tray includes a window.

4. The cooking appliance of clause 1 wherein a lower side of the cooking zone is air impermeable whereby combustion products produced in the combustion zone are isolated from the cooking zone.

5. The cooking appliance of clause 1 wherein the combustion zone air inlet has a variable sized inlet cross-sectional flow area, and the cooking appliance further comprises an inlet adjustment mechanism which varies the cross-sectional flow area of the combustion zone air inlet as a temperature in the combustion zone varies.

6. The cooking appliance of clause 5 wherein the inlet adjustment mechanism comprises a bimetallic strip.

7. The cooking appliance of clause 5 wherein the inlet adjustment mechanism comprises a controller that is operably connected to an adjustable valve and the controller is operable based on a signal issued by a temperature sensor.

8. A cooking appliance comprising:
(a) a combustion zone;
(b) a cooking zone positioned above the combustion zone; and,
(c) a fuel tray that is slideably receivable in the combustion zone and located under the cooking zone when in use.

9. The cooking appliance of clause 8 wherein the cooking appliance has a front and a rear, the openable lid has a rear end that is moveably mounted with respect to the cooking appliance and the fuel tray is slideably receivable in a front end of the combustion zone.

10. The cooking appliance of clause 8 wherein the fuel tray comprises at least first and second discrete fuel zones and the second fuel zone is positioned rearward of the first fuel zone.

11. The cooking appliance of clause 9 wherein a forward end of the fuel tray includes a window.

12. The cooking appliance of clause 8 wherein a lower side of the cooking zone is air impermeable whereby combustion products produced in the combustion zone are isolated from the cooking zone.

13. The cooking appliance of clause 8 wherein the combustion zone has an air inlet that has a variable sized inlet cross-sectional flow area, and the cooking appliance further comprises an inlet adjustment mechanism which varies the cross-sectional flow area of the combustion zone air inlet as a temperature in the combustion zone varies.

14. The cooking appliance of clause 13 wherein the inlet adjustment mechanism comprises a bimetallic strip.

15. The cooking appliance of clause 13 wherein the inlet adjustment mechanism comprises a controller that is operably connected to an adjustable valve and the controller is operable based on a signal issued by a temperature sensor.

Clause Set D

1. A cooking appliance comprising:
(a) a cooking zone comprising a cooking surface;
(b) a combustion zone in thermal communication with the cooking zone; and,
(c) a drip tray that is external to the cooking appliance and the cooking surface directs liquid produced during cooking to the drip tray.

2. The cooking appliance of clause 1 wherein the drip tray is removable from the cooking appliance and provided on an exterior surface of the cooking appliance.

3. The cooking appliance of clause 1 wherein the cooking surface extends downwardly towards the drip tray.

4. The cooking appliance of clause 3 wherein the cooking surface extends downwardly at an angle of up to 15° from a horizontal plane.

5. The cooking appliance of clause 1 wherein the cooking surface is air impermeable.

6. The cooking appliance of clause 5 wherein the cooking surface has a plurality of drainage channels that are in flow communication with the drip tray.

7. The cooking appliance of clause 6 wherein the cooking surface is corrugated.

8. The cooking appliance of clause 6 wherein the cooking surface further comprises a plurality of peaks and a lower surface of the peaks comprises part of an outer wall of the combustion zone whereby the lower surface of the peaks is exposed to combustion products when combustion occurs in the combustion zone.

9. The cooking appliance of clause 6 wherein a body forming the cooking surface is transparent to IR radiation.

10. The cooking appliance of clause 1 wherein a body forming the cooking surface is transparent to IR radiation and an openable lid is IR reflective.

11. The cooking appliance of clause 1 wherein the cooking zone is isolated from combustion products.

12. The cooking appliance of clause 6 wherein the cooking appliance has a front and a rear, an openable lid has a rear end that is moveably mounted with respect to the cooking appliance, and the drainage channels extend in a forward/rearward direction.

13. The cooking appliance of clause 12 wherein the cooking surface further comprises a plurality of peaks, and the peaks have a thickness that is less than a thickness of a lower surface of the drainage channels.

14. The cooking appliance of clause 12 wherein a body forming the cooking surface is transparent to IR radiation.

15. The cooking appliance of clause 12 wherein a body forming the cooking surface is transparent to IR radiation and an openable lid is IR reflective.

16. The cooking appliance of clause 1 wherein the cooking surface is made of copper and/or aluminum.

17. The cooking appliance of clause 1 wherein the cooking surface has a region for receiving a combustible material, the cooking surface further comprises a plurality of peaks, and the region has a lower end which is below the peaks.

18. The cooking appliance of clause 1 wherein the cooking appliance has a front and a rear, an openable lid has a rear end that is moveably mounted with respect to the cooking appliance, and the drip tray is provided at the front of the cooking appliance.

19. The cooking appliance of clause 1 wherein the drip tray is removable from the cooking appliance and provided on an exterior surface of the cooking appliance.

20. The cooking appliance of clause 1 wherein the cooking appliance has a lower end that is insulated to seat on a counter surface, the cooking surface has a plurality of drainage channels that are in flow communication with the drip tray and the drip tray is positionable on the counter surface and underneath an outlet end of the drainage channels without being mounted to the cooking appliance.

The invention claimed is:

1. A cooking appliance comprising:
(a) a combustion zone having a combustion zone air flow path extending from a combustion zone air inlet to a combustion zone air outlet; and,
(b) a cooking zone positioned overlying the combustion zone, the cooking zone comprising a closed cooking volume having a cooking surface and an openable lid,
(c) a chimney in a fixed position relative to the combustion zone and downstream from the combustion zone, the chimney has a chimney air outlet that is provided at an upper end of the chimney and the chimney air outlet is located at an elevation above the closed cooking volume,
whereby combustion products produced in the combustion zone are isolated from the closed cooking volume; and
wherein the openable lid is moveable between a closed position overlying the cooking surface and an open position in which the cooking surface is uncovered while the chimney remains in the fixed position downstream from the combustion zone, wherein the openable lid is rotatable in an upward direction from the closed position to the open position.

2. The cooking appliance of claim 1 wherein a lower side of the cooking zone is air impermeable.

3. The cooking appliance of claim 1 wherein the cooking appliance has a front and a rear, the openable lid has a rear end that is moveably mounted with respect to the cooking appliance, the cooking surface comprises a surface having a plurality of corrugations wherein the corrugations extend in a forward/rearward direction and the cooking surface extends forwardly and downwardly.

4. The cooking appliance of claim 3 wherein a body forming the cooking surface is transparent to IR radiation.

5. The cooking appliance of claim 1 wherein a body forming the cooking surface is transparent to IR radiation and the openable lid is IR reflective.

6. The cooking appliance of claim 1 wherein the cooking appliance has a front and a rear, the openable lid has a rear end that is moveably mounted with respect to the cooking appliance, a chimney is positioned downstream from the combustion zone and rearward of the openable lid, and the chimney has a chimney air outlet is provided at an upper end of the chimney.

7. The cooking appliance of claim 1 wherein the openable lid is removably mounted to the cooking appliance.

8. The cooking appliance of claim 1 wherein the cooking surface comprises a surface having a plurality of corrugations that extend downwardly, wherein a drip tray is located at an outlet end of the plurality of corrugations and exterior to the cooking zone.

9. The cooking appliance of claim 1 wherein, when the openable lid is in the closed position, the combustion zone is closed other than a combustion zone air inlet and a combustion zone air outlet.

10. A cooking appliance comprising:
(a) a combustion zone having a combustion zone air flow path extending from a combustion zone air inlet to a combustion zone air outlet; and,
(b) a cooking zone positioned overlying the combustion zone, the cooking zone comprising a closed cooking volume having a cooking surface and an openable lid, whereby combustion products produced in the combustion zone are isolated from the closed cooking volume; and
wherein a chimney is positioned downstream from the combustion zone, the chimney comprises an inner air flow duct and an outer duct spaced from the inner duct, and a chimney air outlet is provided at an upper end of the inner duct of the chimney.

11. The cooking appliance of claim 10 wherein a gap is provided between the inner duct and the outer duct and the gap is isolated from combustion gasses passing through the chimney and from the cooking zone.

12. The cooking appliance of claim 10 wherein the inner duct has a thickness of 0.01-0.03.

13. A cooking appliance comprising:
(a) a combustion zone having a combustion zone air flow path extending from a combustion zone air inlet to a combustion zone air outlet; and,
(b) a cooking zone positioned overlying the combustion zone, the cooking zone comprising a closed cooking volume having a cooking surface and an openable lid, whereby combustion products produced in the combustion zone are isolated from the closed cooking volume; and
wherein the combustion zone air inlet has a variable sized inlet cross-sectional flow area and the cooking appliance further comprises an inlet adjustment mechanism which automatically varies the variable sized inlet cross-sectional flow area of the combustion zone air inlet as a temperature in the combustion zone varies.

14. The cooking appliance of claim 13 wherein the inlet adjustment mechanism comprises a bimetallic strip.

15. The cooking appliance of claim 13 wherein the inlet adjustment mechanism comprises a controller that is operably connected to an adjustable valve and the controller is operable based on a signal issued by a temperature sensor.

16. A cooking appliance comprising:
(a) a combustion zone having a combustion zone air flow path extending from a combustion zone air inlet to a combustion zone air outlet; and,
(b) a cooking zone positioned overlying the combustion zone, the cooking zone comprising a closed cooking volume having a cooking surface and an openable lid,
(c) a fuel tray that is slideably receivable in a front end of the combustion zone,
whereby combustion products produced in the combustion zone are isolated from the closed cooking volume.

17. The cooking appliance of claim 16 wherein the fuel tray comprises at least a first fuel zone and a second fuel zone discrete from the first fuel zone, and the second fuel zone is positioned rearward of the first fuel zone.

18. The cooking appliance of claim 16 wherein a forward end of the fuel tray includes a window.

19. A cooking appliance comprising:
(a) a combustion zone having a combustion zone air flow path extending from a combustion zone air inlet to a combustion zone air outlet; and,
(b) a cooking zone positioned overlying the combustion zone, the cooking zone comprising a closed cooking volume having a cooking surface and an openable lid,
(c) a drip tray that is external to and forward of the cooking zone,
whereby combustion products produced in the combustion zone are isolated from the closed cooking volume.

20. The cooking appliance of claim 19 wherein the cooking surface comprises a surface having a plurality of corrugations, the plurality of corrugations extend in a forward/rearward direction and the cooking surface extends forwardly and downwardly, whereby the drip tray is located at an outlet end of the plurality of corrugations.

* * * * *